US007793073B2

(12) United States Patent
Kohn

(10) Patent No.: US 7,793,073 B2
(45) Date of Patent: *Sep. 7, 2010

(54) METHOD AND APPARATUS FOR INDIRECTLY ADDRESSED VECTOR LOAD-ADD-STORE ACROSS MULTI-PROCESSORS

(75) Inventor: James R. Kohn, Inver Grove Heights, MN (US)

(73) Assignee: Cray Inc., Seattle, WA (US)

( * ) Notice: Subject to any disclaimer, the term of this patent is extended or adjusted under 35 U.S.C. 154(b) by 452 days.

This patent is subject to a terminal disclaimer.

(21) Appl. No.: 11/771,931

(22) Filed: Jun. 29, 2007

(65) Prior Publication Data

US 2007/0283127 A1 Dec. 6, 2007

Related U.S. Application Data

(63) Continuation of application No. 10/643,727, filed on Aug. 18, 2003, now Pat. No. 7,421,565.

(51) Int. Cl.
*G06F 9/00* (2006.01)

(52) U.S. Cl. .......................................................... 712/4

(58) Field of Classification Search ....................... None
See application file for complete search history.

(56) References Cited

U.S. PATENT DOCUMENTS 3,881,701 A 5/1975 Schoenman et al.
RE28,577 E 10/1975 Schmidt
4,380,786 A 4/1983 Kelly (Continued)

FOREIGN PATENT DOCUMENTS

EP 0353819 2/1990

(Continued)

OTHER PUBLICATIONS

"Cray Assembly Language (CAL) for Cray X1tm Systems Reference Manual", Section 2.6, Memory Ordering, http://docs.cray.com/books/S-2314-51/index.html,(Jun. 2003),302 pgs.

(Continued)

*Primary Examiner*—Eddie P Chan
*Assistant Examiner*—Robert Fennema
(74) *Attorney, Agent, or Firm*—Schwegman, Lundberg & Woessner, P.A.

(57) ABSTRACT

A method and apparatus to correctly compute a vector-gather, vector-operate (e.g., vector add), and vector-scatter sequence, particularly when elements of the vector may be redundantly presented, as with indirectly addressed vector operations. For an add operation, one vector register is loaded with the "add-in" values, and another vector register is loaded with address values of "add to" elements to be gathered from memory into a third vector register. If the vector of address values has a plurality of elements that point to the same memory address, the algorithm should add all the "add in" values from elements corresponding to the elements having the duplicated addresses. An indirectly addressed load performs the "gather" operation to load the "add to" values. A vector add operation then adds corresponding elements from the "add in" vector to the "add to" vector. An indirectly addressed store then performs the "scatter" operation to store the results.

8 Claims, 5 Drawing Sheets

U.S. PATENT DOCUMENTS

| | | | |
|---|---|---|---|
| 4,414,624 | A | 11/1983 | Summer, Jr. et al. |
| 4,541,046 | A | 9/1985 | Nagashima et al. |
| 4,733,348 | A | 3/1988 | Hiraoka et al. |
| 4,771,391 | A | 9/1988 | Blasbalg |
| 4,868,818 | A | 9/1989 | Madan et al. |
| 4,888,679 | A | 12/1989 | Fossum et al. |
| 4,933,933 | A | 6/1990 | Dally et al. |
| 5,008,882 | A | 4/1991 | Peterson et al. |
| 5,012,409 | A | 4/1991 | Fletcher et al. |
| 5,031,211 | A | 7/1991 | Nagai et al. |
| 5,036,459 | A | 7/1991 | Den Haan et al. |
| 5,068,851 | A | 11/1991 | Bruckert et al. |
| 5,072,883 | A | 12/1991 | Vidusek |
| 5,105,424 | A | 4/1992 | Flaig et al. |
| 5,157,692 | A | 10/1992 | Horie et al. |
| 5,161,156 | A | 11/1992 | Baum et al. |
| 5,170,482 | A | 12/1992 | Shu et al. |
| 5,175,733 | A | 12/1992 | Nugent |
| 5,197,130 | A | 3/1993 | Chen et al. |
| 5,218,601 | A | 6/1993 | Chujo et al. |
| 5,218,676 | A | 6/1993 | Ben-ayed et al. |
| 5,220,804 | A | 6/1993 | Tilton et al. |
| 5,239,545 | A | 8/1993 | Buchholz |
| 5,247,635 | A | 9/1993 | Kamiya |
| 5,247,691 | A | 9/1993 | Sakai |
| 5,276,899 | A | 1/1994 | Neches |
| 5,280,474 | A | 1/1994 | Nickolls et al. |
| 5,297,738 | A | 3/1994 | Lehr et al. |
| 5,311,931 | A | 5/1994 | Lee |
| 5,313,628 | A | 5/1994 | Mendelsohn et al. |
| 5,313,645 | A | 5/1994 | Rolfe |
| 5,331,631 | A | 7/1994 | Teraslinna |
| 5,333,279 | A | 7/1994 | Dunning |
| 5,341,504 | A | 8/1994 | Mori et al. |
| 5,347,450 | A | 9/1994 | Nugent |
| 5,353,283 | A | 10/1994 | Tsuchiya |
| 5,365,228 | A | 11/1994 | Childs et al. |
| 5,418,916 | A | 5/1995 | Hall et al. |
| 5,430,850 | A | 7/1995 | Papadopoulos et al. |
| 5,430,884 | A | 7/1995 | Beard et al. |
| 5,434,995 | A | 7/1995 | Oberlin et al. |
| 5,435,884 | A | 7/1995 | Simmons et al. |
| 5,437,017 | A | 7/1995 | Moore et al. |
| 5,440,547 | A | 8/1995 | Easki et al. |
| 5,446,915 | A | 8/1995 | Pierce |
| 5,456,596 | A | 10/1995 | Gourdine |
| 5,472,143 | A | 12/1995 | Bartels et al. |
| 5,497,480 | A | 3/1996 | Hayes et al. |
| 5,517,497 | A | 5/1996 | LeBoudec et al. |
| 5,546,549 | A | 8/1996 | Barrett et al. |
| 5,548,639 | A | 8/1996 | Ogura et al. |
| 5,550,589 | A | 8/1996 | Shiojiri et al. |
| 5,555,542 | A | 9/1996 | Ogura et al. |
| 5,560,029 | A | 9/1996 | Papadopoulos et al. |
| 5,606,696 | A | 2/1997 | Ackerman et al. |
| 5,640,524 | A | 6/1997 | Beard et al. |
| 5,649,141 | A | 7/1997 | Yamazaki |
| 5,684,977 | A | 11/1997 | Van Loo et al. |
| 5,717,895 | A | 2/1998 | Leedom et al. |
| 5,721,921 | A | 2/1998 | Kessler et al. |
| 5,740,967 | A | 4/1998 | Simmons et al. |
| 5,765,009 | A | 6/1998 | Ishizaka |
| 5,781,775 | A | 7/1998 | Ueno |
| 5,787,494 | A | 7/1998 | Delano et al. |
| 5,812,844 | A | 9/1998 | Jones et al. |
| 5,860,146 | A | 1/1999 | Vishin et al. |
| 5,860,602 | A | 1/1999 | Tilton et al. |
| 5,897,664 | A | 4/1999 | Nesheim et al. |
| 5,946,717 | A | 8/1999 | Uchibori |
| 5,951,882 | A | 9/1999 | Simmons et al. |
| 5,978,830 | A | 11/1999 | Nakaya et al. |
| 5,995,752 | A | 11/1999 | Chao et al. |
| 6,003,123 | A | 12/1999 | Carter et al. |
| 6,016,969 | A | 1/2000 | Tilton et al. |
| 6,088,701 | A | 7/2000 | Whaley et al. |
| 6,101,590 | A | 8/2000 | Hansen |
| 6,105,113 | A | 8/2000 | Schimmel |
| 6,161,208 | A | 12/2000 | Dutton et al. |
| 6,247,169 | B1 | 6/2001 | DeLong |
| 6,269,390 | B1 | 7/2001 | Boland |
| 6,269,391 | B1 | 7/2001 | Gillespie |
| 6,308,250 | B1 | 10/2001 | Klausler |
| 6,308,316 | B1 | 10/2001 | Hashimoto et al. |
| 6,317,819 | B1 | 11/2001 | Morton |
| 6,339,813 | B1 | 1/2002 | Smith et al. |
| 6,356,983 | B1 | 3/2002 | Parks |
| 6,366,461 | B1 | 4/2002 | Pautsch et al. |
| 6,389,449 | B1 | 5/2002 | Nemirovsky et al. |
| 6,430,649 | B1 | 8/2002 | Chaudhry et al. |
| 6,490,671 | B1 | 12/2002 | Frank et al. |
| 6,496,902 | B1 | 12/2002 | Faanes et al. |
| 6,591,345 | B1 | 7/2003 | Seznec |
| 6,615,322 | B2 | 9/2003 | Arimilli et al. |
| 6,665,774 | B2 | 12/2003 | Faanes et al. |
| 6,684,305 | B1 | 1/2004 | Deneau |
| 6,782,468 | B1 | 8/2004 | Nakazato |
| 6,816,960 | B2 | 11/2004 | Koyanagi |
| 6,879,948 | B1 | 4/2005 | Chalfin et al. |
| 6,922,766 | B2 | 7/2005 | Scott |
| 6,925,547 | B2 | 8/2005 | Scott et al. |
| 6,931,510 | B1 | 8/2005 | Damron |
| 6,976,155 | B2 | 12/2005 | Drysdale et al. |
| 7,028,143 | B2 | 4/2006 | Barlow et al. |
| 7,089,557 | B2 | 8/2006 | Lee |
| 7,103,631 | B1 | 9/2006 | van der Veen |
| 7,111,296 | B2 | 9/2006 | Wolrich et al. |
| 7,137,117 | B2 | 11/2006 | Ginsberg |
| 7,143,412 | B2 | 11/2006 | Koenen |
| 7,162,713 | B2 | 1/2007 | Pennello |
| 7,191,444 | B2 | 3/2007 | Alverson et al. |
| 7,334,110 | B1 | 2/2008 | Faanes et al. |
| 7,363,472 | B2 * | 4/2008 | Stuttard et al. .............. 712/225 |
| 7,366,873 | B1 | 4/2008 | Kohn |
| 7,421,565 | B1 | 9/2008 | Kohn |
| 7,437,521 | B1 | 10/2008 | Scott et al. |
| 7,543,133 | B1 | 6/2009 | Scott |
| 7,577,816 | B2 | 8/2009 | Sheets et al. |
| 2002/0091747 | A1 | 7/2002 | Rehg et al. |
| 2002/0169938 | A1 | 11/2002 | Scott et al. |
| 2002/0172199 | A1 | 11/2002 | Scott et al. |
| 2003/0005380 | A1 | 1/2003 | Nguyen et al. |
| 2003/0097531 | A1 | 5/2003 | Arimilli et al. |
| 2003/0167383 | A1 | 9/2003 | Gupta et al. |
| 2004/0044872 | A1 | 3/2004 | Scott |
| 2004/0162949 | A1 | 8/2004 | Scott et al. |
| 2005/0044128 | A1 | 2/2005 | Scott et al. |
| 2005/0044339 | A1 | 2/2005 | Sheets |
| 2005/0044340 | A1 | 2/2005 | Sheets et al. |

FOREIGN PATENT DOCUMENTS

| | | | |
|---|---|---|---|
| EP | 0353819 | A2 | 2/1990 |
| EP | 0475282 | | 9/1990 |
| EP | 0473452 | | 3/1992 |
| EP | 0473452 | A2 | 3/1992 |
| EP | 0475282 | A2 | 3/1992 |
| EP | 0501524 | | 9/1992 |
| EP | 0501524 | A2 | 9/1992 |
| EP | 0570729 | | 11/1993 |
| EP | 0570729 | A2 | 11/1993 |
| WO | WO-87/01750 | | 3/1987 |
| WO | WO-8701750 | A1 | 3/1987 |
| WO | WO-88/08652 | | 11/1988 |
| WO | WO-8808652 | A1 | 11/1988 |

| | | |
|---|---|---|
| WO | WO-95/16236 | 6/1995 |
| WO | WO-9516236 | 6/1995 |
| WO | WO-9610283 A1 | 4/1996 |
| WO | WO-9632681 A1 | 10/1996 |

OTHER PUBLICATIONS

"Deadlock-Free Routing Schemes on Multistage Interconnection Networks", *IBM Technical Disclosure Bulletin*, 35, (Dec. 1992),232-233.
"ECPE 4504: Computer Organization Lecture 12: Computer Arithmetic", The Bradley Department of Electrical Engineering,(Oct. 17, 2000),12 pgs.
"International Search Report for corresponding PCT Application No. PCT/US2004/026814", (Mar. 10, 2005),2 pgs.
"International Search Report for International Application No. PCT/IE 95/00047", Date of Completion—Dec. 22, 1995; Authorized Officer—R. Salm.
"International Search Report for International Application No. PCT/US 95/15483", Date of completion—Apr. 24, 1996; Authorized Officer—P. Schenkels.
"Msync—Synchronise Memory with Physical Storage", *The Single UNIXÂ® Specification, Version 2: Msync, The Open Group*, http://www.opengroup.org/onlinepubs/007908799/xsh/msync.html,(1997),3 pgs.
Abts, D , "So Many States, So Little Time: Verifying Memory Coherence in the Cray X1", *Parallel and Distributed Processing Symposium*, (Apr. 22, 2003),11-20.
Adve, V. S., et al., "Performance Analysis of Mesh Interconnection Networks with Deterministic Routing", *Transactions on Parallel and Distributed Systems*, 5(5), (Mar. 1994),225-246.
Bolding, Kevin , "Non-Uniformities Introduced by Virtual Channel Deadlock Prevention", *Technical Report* Jul. 7, 1992, *Department of Computer Science and Engineering*, FR-35 University of Washington; Seattle, WA 98195, (Jul. 21, 1992).
Bolla, R. , "A Neural Strategy for Optimal Multiplexing of Circuit and Packet-Switched Traffic", *Proceedings, IEEE Global Telecommunications Conference*, (1992),1324-1330.
Boura, Y. M., et al., "Efficient Fully Adaptive Wormhole Routing in n-dimensional Meshes", *Proceedings, International Conference on Distributed Computing Systems*, (Jun. 1994),589-596.
Bundy, A. , et al., "Turning Eureka Steps into Calculations in Automatic Program Synthesis", *Proceedings of UK IT 90*, (*IEE Conf. Pub. 316*) (*DAI Research Paper 448*), (1991),221-226.
Carlile, Bradley R., "Algorithms and Design: The CRAY APP Shared-Memory System", *COMPCON Spring '93, Digest of Papers.*, (Feb. 22, 1993),312-320.
Chen, Y. , et al., "UTLB: A Mechanism for Address Translation on Network Interfaces", *Proceedings of the Eighth International Conference on Architectural Support for Programming Languages and Operating Systems* (*ASPLOS*), (1998),193-204.
Chien, A. A., et al., "Planar-Adaptive Routing: Low-Cost Adaptive Networks for Multiprocessors", *Proceedings 19th International. Symposium on Computer Architecture*, (May 1992),268-277.
Cohoon, J. , et al., *C++ Program Design*, McGraw-Hill Companies, Inc., 2nd Edition,(1999),493.
Dally, W. J., et al., "Deadlock-Free Adaptive Routing in Multicomputer Networks Using Virtual Channels", *IEEE Transactions on Parallel and Distributed Systems*, 4(4), (Apr. 1993),466-475.
Dally, William , et al., "Deadlock-Free Message Routing in Multiprocessor Interconnection Networks", *IEEE Transactions on Computers*, C-36, (May 1987),547-553.
Dally, William , "Performance Analysis of k-ary n-cube Interconnection Networks", *IEEE Transactions on Computers*, 39(6), (Jun. 1990),775-785.
Dally, W. J., "Virtual Channel Flow Control", *Proceedings, 17th International Symposium on Computer Architecture*, (May 1990),60-68.
Duato, J. , "A New Theory of Deadlock-Free Adaptive Routing in Wormhole Networks", *IEEE Transactions on Parallel and Distributed Systems*, 4(12), (Dec. 1993),1320-1331.
Ernst, D. , et al., "Cyclone: A Broadcast-Free Dynamic Instruction Scheduler with Selective Replay", *30th Annual International Symposium on Computer Architecture* (*ISCA-2003*), (Jun. 2003),10 pgs.
Faanes, G. J., et al., "Decoupled Vector Architecture", U.S. Appl. No. 10/643,586, filed Aug. 18, 2003, 47 Pages.
Gallager, Robert , "Scale Factors for Distributed Routing Algorithm", *NTC '77 Conference Record*, vol. 2, (1977),28:2-1-28:2-5.
Gharachorloo, Kourosh , "Two Techniques to Enhance the Performance of Memory Consistency Models", *Proceedings of the International Conference on Parallel Processing*, (1991),1-10.
Glass, C. J., et al., "The Turn Model for Adaptive Routing", *Proceedings, 19th Interanational Symposium on Computer Architecture*, (May 1992),278-287.
Gravano, L , et al., "Adaptive Deadlock- and Livelock-Free Routing with all Minimal Paths in Torus Networks", *IEEE Transactions on Parallel and Distributed Systems*, 5(12), (Dec. 1994),1233-1251.
Gupta, Rajiv , et al., "High Speed Synchronization of Processors Using Fuzzy Barriers", *International Journal of Parallel Programming* 19(1), (Feb. 1990),53-73.
Ishihata, Hiroaki , et al., "Architecture of Highly Parallel AP1000 Computer", *Systems and Computers in Japan*, 24(7), (1993),69-76.
Jesshope, C. R., et al., "High Performance Communications in Processor Networks", *Proc. 16th International Symposium on Computer Architecture*, (May 1989),pp. 150-157.
Kirkpatrick, S. , et al., "Optimization by Simulated Annealing", *Science*, 220(4598), (May 13, 1983),671-680.
Kontothanassis, L. , et al., "VM-based shared memory on low-latency, remote-memory-access networks", *Proceedings of the ACM ISCA '97*, (1997),157-169.
Linder, Daniel H., et al., "An Adaptive and Fault Tolerant Wormhole Routing Strategy for k-ary n-cubes", *IEEE Transactions on Computers*,40(1), (1991),2-12.
Lui, Z , et al., "Grouping Virtual Channels for Deadlock-Free Adaptive Wormhole Routing", *5th International Conference, Parallel Architectures and Languages Europe* (*PARLE '93*), (Jun. 14-17, 1993),254-265.
Nuth, Peter , et al., "The J-Machine Network", *Proceedings of the IEEE International Conference on Computer Design on VLSI in Computer & Processors*, (1992),420-423.
O'Keefe, Matthew T., et al., "Static Barrier MIMD: Architecture and Performance Analysis", *Journal of Parallel and Distributed Computing*, 25(2), (Mar. 25, 1995),126-132.
Patterson, David A., et al., *Computer Architecture: A Quantitative Approach*, 2nd Edition, Morgan Kaufmann Publishers, Inc., San Francisco, CA,(1996),39-41.
Patterson, David A., et al., *Computer Architecture: A Quantitative Approach*, 2nd Edition, Morgan Kaufmann Publishers, Inc., San Francisco, CA,(1996),699-708.
Patterson, D. A., et al., *Computer Architecture: A Quantitative Approach*, 2nd Edition, Morgan Kaufmann Publishers, Inc., San Francisco, CA,(1996),194-197.
Patterson, D. A., et al., *Computer Architecture A Quantitative Approach*, 2nd Edition, Morgan Kaufmann Publishers, Inc., San Francisco,CA,(1996),255-260 & 308-317.
Patterson, D. A., et al., *Computer Architecture: A Quantitative Approach*, 2nd Edition, Morgan Kaufmann Publishers, San Francisco, CA,(1996),241-243.
Patterson, David A., et al., *Computer Architecture: A Quantitative Approach*, 2nd Edition, Morgan Kaufmann Publishers, Inc., San Francisco, CA,(1996),1 79-187, 373-384.
Scott, S. L., "Decoupled Store Address and Data in a Multiprocessor System", U.S. Appl. No. 10/643,742, filed Aug. 18, 2003, 27 Pages.
Scott, S. L., "Latency Tolerant Distributed Shared Memory Multiprocessor Computer", U.S. Appl. No. 10/643,585, filed Aug. 18, 2003, 17 Pages.
Scott, S. L., et al., "Multistream Processing Memory-And Barrier-Synchronization Method and Apparatus", U.S. Appl. No. 10/643,741, filed Aug. 18, 2003, 143 pages.
Scott, S. L., et al., "Relaxed Memory Consistency Model", U.S. Appl. No. 10/643,754, filed Aug. 18, 2003, 144 Pages.
Scott, S. , "Synchronization and Communication in the T3E Multiprocessor", *ASPLOS*, vol. II, (1996),pp. 26-36.

Sheets, K. , et al., "Remote-Translation Mechanism for a Multinode System", U.S. Appl. No. 10/643,758, filed Aug. 18, 2003, 42 Pages.
Shumway, M , "Deadlock-Free Packet Networks", *Transputer Research and Applications 2, NATUG-2 Proceedings of the Second Conference of the North American Transputer Users Group*, (Oct. 18-19, 1989),139-177.
Snyder, L. , "Introduction to the Configurable, Highly Parallel Computer", *IEEE Computer 15*(1), (Jan. 1982),47-56.
Talia, D. , "Message-Routing Systems for Transputer-Based Multicomputers", *IEEE Micro*, 13(3), (Jun. 1993),62-72.
Wang, Weilin , et al., "Trunk Congestion Control in Heterogeneous Circuit Switched Networks", *IEEE Transactions on Communications*, 40(7), (Jul. 1992),1156-1161.
Wood, D. A., et al., "An In-Cache Address Translation Mechanism", *Proceedings of the 13th Annual International Symposium on Computer Architecture*, (1986),358-365.
Wu, Min-You , et al., "DO and FORALL: Temporal and Spatial Control Structures", *Proceedings, Third Workshop on Compilers for Parallel Computers, ACPC/TR*, (Jul. 1992),258-269.
Yang, C. S., et al., "Performance Evaluation of Multicast Wormhole Routing in 2D-Torus Multicomputers", *Proceedings, Fourth International Conference on Computing and Information* (*ICCI '92*), (1992),173-178.
Yantchev, J., et al., "Adaptive, Low Latency, Deadlock-Free Packet Routing for Networks of Processors", *IEEE Proceedings*, 136, Part E, No. 3, (May 1989),178-186.
"U.S. Appl. No. 10/235,898, Non Final Office Action mailed Jul. 7, 2004", 10 pgs.
"U.S. Appl. No. 10/235,898, Response filed Jan. 6, 2005 to Non Final Office Action mailed Jul. 7, 2004", 16 pgs.
"U.S. Appl. No. 10/643,574, Non-Final Office Action Mailed Aug. 7, 2007", 31 pgs.
"U.S. Appl. No. 10/643,574, Advisory Action mailed May 21, 2007", 3 pgs.
"U.S. Appl. No. 10/643,574, Final Office Action mailed Mar. 5, 2007", 31 pgs.
"U.S. Appl. No. 10/643,574, Non-Final Office Action mailed Jan. 30, 2006", 33 pgs.
"U.S. Appl. No. 10/643,574, Non-Final Office Action mailed Jul. 28, 2006", 30 pgs.
"U.S. Appl. No. 10/643,574, RCE and Response Under 37 C.F.R. 1.116 filed Jul. 12, 2007 to Final Office Action mailed Mar. 5, 2007", 19 pgs.
"U.S. Appl. No. 10/643,574, Response filed Nov. 28, 2006 to Non-Final Office Action mailed Jul. 28, 2006", 15 pgs.
"U.S. Appl. No. 10/643,574, Response filed Nov. 7, 2007 to Non-final Office Action mailed Aug. 7, 2007", 15 pgs.
"U.S. Appl. No. 10/643,574, Response filed May 1, 2006 to Non-Final Office Action mailed Jan. 30, 2006", 29 pgs.
"U.S. Appl. No. 10/643,574, Response filed May 4, 2007 to Final Office Action mailed Mar. 5, 2007", 15 pgs.
"U.S. Appl. No. 10/643,574, Response filed Jul. 12, 2007 to Advisory Action mailed Mar. 5, 2007", 16 pgs.
"U.S. Appl. No. 10/643,585, Advisory Action mailed Apr. 2, 2007", 3 pgs.
"U.S. Appl. No. 10/643,585, Advisory Action mailed Aug. 14, 2006", 3 pgs.
"U.S. Appl. No. 10/643,585, Amendment and Response filed Dec. 4, 2006 to Office Action mailed Oct. 23, 2006", 17 pgs.
"U.S. Appl. No. 10/643,585, Amendment and Response filed Mar. 22, 2007 to Final Office Action mailed Jan. 25, 2007", 23 pgs.
"U.S. Appl. No. 10/643,585, Amendment and Response filed Mar. 27, 2006 to Non-Final Office Action mailed Sep. 26, 2005", 7 pgs.
"U.S. Appl. No. 10/643,585, Amendment and Response filed Aug. 3, 2006 to Final Office Action mailed Apr. 14, 2006", 9 pgs.
"U.S. Appl. No. 10/643,585, Final Office Action mailed Jan. 25, 2007", 17 pgs.
"U.S. Appl. No. 10/643,585, Final Office Action mailed Apr. 14, 2006", 13 pgs.
"U.S. Appl. No. 10/643,585, Non-Final Office Action mailed Oct. 23, 2006", 12 pgs.
"U.S. Appl. No. 10/643,585, Non-Final Office Action mailed Sep. 26, 2005", 9 pgs.
"U.S. Appl. No. 10/643,585, RCE and Amendment and Response filed Apr. 23, 2007 to Final Office Action mailed Jan. 25, 2007 and the Advisory Action mailed Apr. 2, 2007", 15 pgs.
"U.S. Appl. No. 10/643,585, Response to Rule 312 Communication mailed Jul. 23, 2007", 2 pgs.
"U.S. Appl. No. 10/643,586, Advisory Action mailed Jan. 18, 2007", 3 pgs.
"U.S. Appl. No. 10/643,586, Final Office Action mailed Oct. 19, 2006", 27 pgs.
"U.S. Appl. No. 10/643,586, Non-Final Office Action mailed Feb. 8, 2006", 21 pgs.
"U.S. Appl. No. 10/643,586, Non-Final Office Action mailed May 2, 2007", 36 pgs.
"U.S. Appl. No. 10/643,586, Response filed Jan. 5, 2007 to Final Office Action mailed Oct. 19, 2006", 22 pgs.
"U.S. Appl. No. 10/643,586, Response filed Aug. 1, 2006 to Non-Final Office Action mailed Feb. 8, 2006", 24 pgs.
"U.S. Appl. No. 10/643,586 Response to Non-Final Office Action filed Sep. 4, 2007", 18 pgs.
"U.S. Appl. No. 10/643,586, Response filed Feb. 16, 2007 to Advisory Action mailed Oct. 19, 2006", 18 pgs.
"U.S. Appl. No. 10/643,727, Non-Final Office Action mailed Feb. 16, 2006", 33 pgs.
"U.S. Appl. No. 10/643,727, Non-Final Office Action mailed Aug. 11, 2006", 29 pgs.
"U.S. Appl. No. 10/643,727, Response filed Jan. 11, 2007 to Non-Final Office Action mailed Aug. 11, 2006", 20 pgs.
"U.S. Appl. No. 10/643,727, Response filed Jun. 15, 2006 to Non-Final Office Action mailed Feb. 16, 2006", 21 pgs.
"U.S. Appl. No. 10/643,738 Response filed Jan. 16, 2006 non-final office action mailed Sep. 26, 2005", 13 pgs.
"U.S. Appl. No. 10/643,738 Response filed Jun. 19, 2006 non-final office action mailed Feb. 17, 2006", 10 pgs.
"U.S. Appl. No. 10/643,738, Advisory Action mailed Jul. 31, 2007", 3 pgs.
"U.S. Appl. No. 10/643,738, Final Office Action mailed Apr. 17, 2007", 12 pgs.
"U.S. Appl. No. 10/643,738, Non-Final Office Action mailed Nov. 1, 2007", 19 pgs.
"U.S. Appl. No. 10/643,738, Non-Final Office Action mailed Feb. 17, 2006", 9 Pgs.
"U.S. Appl. No. 10/643,738, Non-Final Office Action mailed Sep. 26, 2005", 11 pgs.
"U.S. Appl. No. 10/643,738, Response filed Jul. 17, 2007 final office action mailed Apr. 17, 2007", 17 pgs.
"U.S. Appl. No. 10/643,741 Final Office Action mailed Sep. 11, 2007", 26 pgs.
"U.S. Appl. No. 10/643,741, Amendment and Response mailed Nov. 13, 2007 to Final Office Action mailed Sep. 11, 2007", 14 pgs.
"U.S. Appl. No. 10/643,741, Non-Final Office Action mailed Apr. 5, 2007", 19 pgs.
"U.S. Appl. No. 10/643,741, Response filed Jun. 4, 2007 to Non-Final Office Action mailed Apr. 5, 2007", 16 pgs.
"U.S. Appl. No. 10/643,741, Supplemental Notice of Allowability mailed Mar. 25, 2008", 6 Pgs.
"U.S. Appl. No. 10/643,742 Non-Final Office Action mailed Apr. 9, 2008", 12 pgs.
"U.S. Appl. No. 10/643,742, Non-Final Office Action mailed Jun. 4, 2007", 13 pgs.
"U.S. Appl. No. 10/643,742, Response filed Oct. 11, 2007 to Non-Final Office Action mailed Jun. 4, 2007", 18 pgs.
"U.S. Appl. No. 10/643,754, Advisory Action mailed Feb. 8, 2008", 3 pgs.
"U.S. Appl. No. 10/643,754, Final Office Action Mailed Nov. 26, 2007", 29 pgs.
"U.S. Appl. No. 10/643,754, Final Office action mailed Sep. 14, 2006", 21 pgs.
"U.S. Appl. No. 10/643,754, Non-Final Office Action mailed Feb. 8, 2006", 16 pgs.
"U.S. Appl. No. 10/643,754, Non-Final Office Action mailed Jul. 5, 2007", 23 pgs.
"U.S. Appl. No. 10/643,754, Response filed Mar. 26, 2008 to Final Office Action mailed Sep. 26, 2007", 12 pgs.

"U.S. Appl. No. 10/643,754, Response filed Jan. 25, 2008 to Final Office Action mailed Nov. 25, 2007", 20 pgs.
"U.S. Appl. No. 10/643,754, Response filed Nov. 7, 2006 to Final Office Action mailed Sep. 14, 2006", 12 pgs.
"U.S. Appl. No. 10/643,754, Response filed Mar. 30, 2007 to Advisory Action mailed Nov. 22, 2006", 10 pgs.
"U.S. Appl. No. 10/643,754, Response filed Jul. 10, 2006 to Non-Final Office Action mailed Feb. 8, 2006", 12 pgs.
"U.S. Appl. No. 10/643,754, Amendment & Response filed Oct. 9, 2007 to Non-final OA mailed Jul. 5, 2007", 14 pgs.
"U.S. Appl. No. 10/643,754, Non-Final Office Action mailed Jun. 25, 2008", 30 pgs.
"U.S. Appl. No. 10/643,758, Advisory Action mailed May 1, 2007", 3 pgs.
"U.S. Appl. No. 10/643,758, Final Office Action mailed Feb. 6, 2007", 23 pgs.
"U.S. Appl. No. 10/643,758, Final Office Action mailed Mar. 10, 2006", 13 pgs.
"U.S. Appl. No. 10/643,758, Non-Final Office Action mailed Aug. 15, 2006", 15 pgs.
"U.S. Appl. No. 10/643,758, Non-Final Office Action mailed Aug. 30, 2005", 8 pgs.
"U.S. Appl. No. 10/643,758, Notice of Allowance mailed Jul. 19, 2007", 4 pgs.
"U.S. Appl. No. 10/643,758, Response filed Jul. 10, 2006 to Final Office Action mailed Mar. 10, 2006", 9 pgs.
"U.S. Appl. No. 10/643,758, Response filed Jan. 30, 2006 to Non-Final Office Action mailed Aug. 30, 2005", 9 pgs.
"U.S. Appl. No. 10/643,758, Response filed Dec. 14, 2006 to Non-Final Office Action mailed Aug. 15, 2006", 17 pgs.
"U.S. Appl. No. 10/643,758, Response filed Apr. 17, 2007 to Final Office Action mailed Feb. 6, 2007", 25 pgs.
Handy, J., "The Cache Memory Book", *Academic Press*, (1993), 73-84.
"U.S. Appl. No. 10/643,585, Non-Final Office Action mailed on Sep. 15, 2008", 14 pgs.
"U.S. Appl. No. 10/643,585, Notice of Allowance mailed Jun. 11, 2007", 2 pgs.
"U.S. Appl. No. 10/643,585, Response filed Dec. 15, 2008 to Non-Final Office Action mailed Sep. 15, 2008", 12 pgs.
"U.S. Appl. No. 10/643,742, Advisory Action mailed Apr. 3, 2009", 3 pgs.
"U.S. Appl. No. 10/643,742, Final Office Action mailed Feb. 23, 2009", 7 pgs.
"U.S. Appl. No. 10/643,742, Final Office Action mailed Dec. 12, 2008", 7 pgs.
"U.S. Appl. No. 10/643,742, Pre-Appeal Brief Request filed Nov. 19, 2009", 6 pgs.
"U.S. Appl. No. 10/643,742, Response filed Jan. 26, 2009 to Final Office Action mailed Dec. 12, 2008", 14 pgs.
"U.S. Appl. No. 10/643,742, Response filed Mar. 25, 2009 to Final Office Action mailed Feb. 23, 2009", 15 pgs.
"U.S. Appl. No. 10/643,742, Response filed Oct. 9, 2008 to Non Final Office Action mailed Apr. 9, 2008", 15 pgs.
"U.S. Appl. No. 10/643,754, Advisory Action mailed Nov. 7, 2008", 2 pgs.
"U.S. Appl. No. 10/643,754, Appeal Brief filed Oct. 27, 2008", 37 pgs.
"U.S. Appl. No. 10/643,754, Examiner's Answer mailed Feb. 13, 2009", 35 pgs.
"U.S. Appl. No. 10/643,754, Response filed Oct. 24, 2008 to Non-Final Office Action mailed Jun. 25, 2008", 10 pgs.
"U.S. Appl. No. 10/643,758, Non-Final Office Action mailed Oct. 8, 2008", 9 pgs.
"U.S. Appl. No. 10/643,758, Notice of Allowance mailed Feb. 27, 2009", 4 pgs.
"U.S. Appl. No. 10/643,758, Response filed Jan. 8, 2009 to Non-Final Office Action mailed Oct. 8, 2008", 13 pgs.
"U.S. Appl. No. 10/643,742, Non-Final Office Action mailed Jun. 16, 2009", 7 pgs.
US 7,243,211, 07/2007, Kohn (withdrawn)

* cited by examiner

METHOD AND APPARATUS FOR INDIRECTLY ADDRESSED VECTOR LOAD-ADD-STORE ACROSS MULTI-PROCESSORS

RELATED APPLICATIONS

This application is a continuation under 37 C.F.R. 1.53(b) of U.S. patent application Ser. No. 10/643,727 filed Aug. 18, 2003, now U.S. Pat. No. 7,421,565 which is incorporated herein by reference and made a part hereof.

This application is also related to U.S. patent application Ser. No. 10/643,742, entitled "Decoupled Store Address and Data in a Multiprocessor System", filed on even date herewith; to U.S. patent application Ser. No. 10/643,586, entitled "Decoupled Vector Architecture", filed on even date herewith; to U.S. patent application Ser. No. 10/643,585, entitled "Latency Tolerant Distributed Shared Memory Multiprocessor Computer", filed on even date herewith; to U.S. patent application Ser. No. 10/643,754, entitled "Relaxed Memory Consistency Model", filed on even date herewith; to U.S. patent application Ser. No. 10/643,758, entitled "Remote Translation Mechanism for a Multinode System", filed on even date herewith; and to U.S. patent application Ser. No. 10/643,741, entitled Multistream Processing Memory-And Barrier-Synchronization Method And Apparatus", filed on even date herewith; each of which is incorporated herein by reference.

FIELD OF THE INVENTION

This invention relates to the field of vector computers, and more specifically to a method and apparatus to correctly computer a vector-load, vector-operate (such as a vector add), and vector-store sequence, particularly when elements of the vector may be redundantly presented as in the case of indirectly addressed vector operations from and to memory.

BACKGROUND OF THE INVENTION

Indirectly addressed operands are frequently used in computer programs. For example, one typical situation provides a load instruction that specifies a register having an address of an operand in memory (rather than the address being partially or completely specified directly by the instruction), and another register that is the destination of the operand being fetched or loaded. A store instruction using indirect addressing would similarly specify a register that holds the address in memory of the destination, and another register that is the source of the operand being stored.

Vector computers provide a fast and compact way of programming for codes that are amenable to vectorizing to improve speed and programming efficiency.

What is needed is a fast, repeatable, and accurate way of performing various indirectly addressed operations in a vector computer.

SUMMARY OF THE INVENTION

The present invention provides a method and apparatus to correctly compute a vector-gather, vector-operate (e.g., vector add), and vector-scatter sequence, particularly when elements of the vector may be redundantly presented, as with indirectly addressed vector operations. For an add operation, one vector register is loaded with the "add-in" values, and another vector register is loaded with address values of "add to" elements to be gathered from memory into a third vector register. If the vector of address values has a plurality of elements that point to the same memory address, the algorithm should add all the "add in" values from elements corresponding to the elements having the duplicated addresses. An indirectly addressed load performs the "gather" operation to load the "add to" values. A vector add operation then adds corresponding elements from the "add in" vector to the "add to" vector. An indirectly addressed store then performs the "scatter" operation to store the results.

DESCRIPTION OF PREFERRED EMBODIMENTS

Figure 1A:
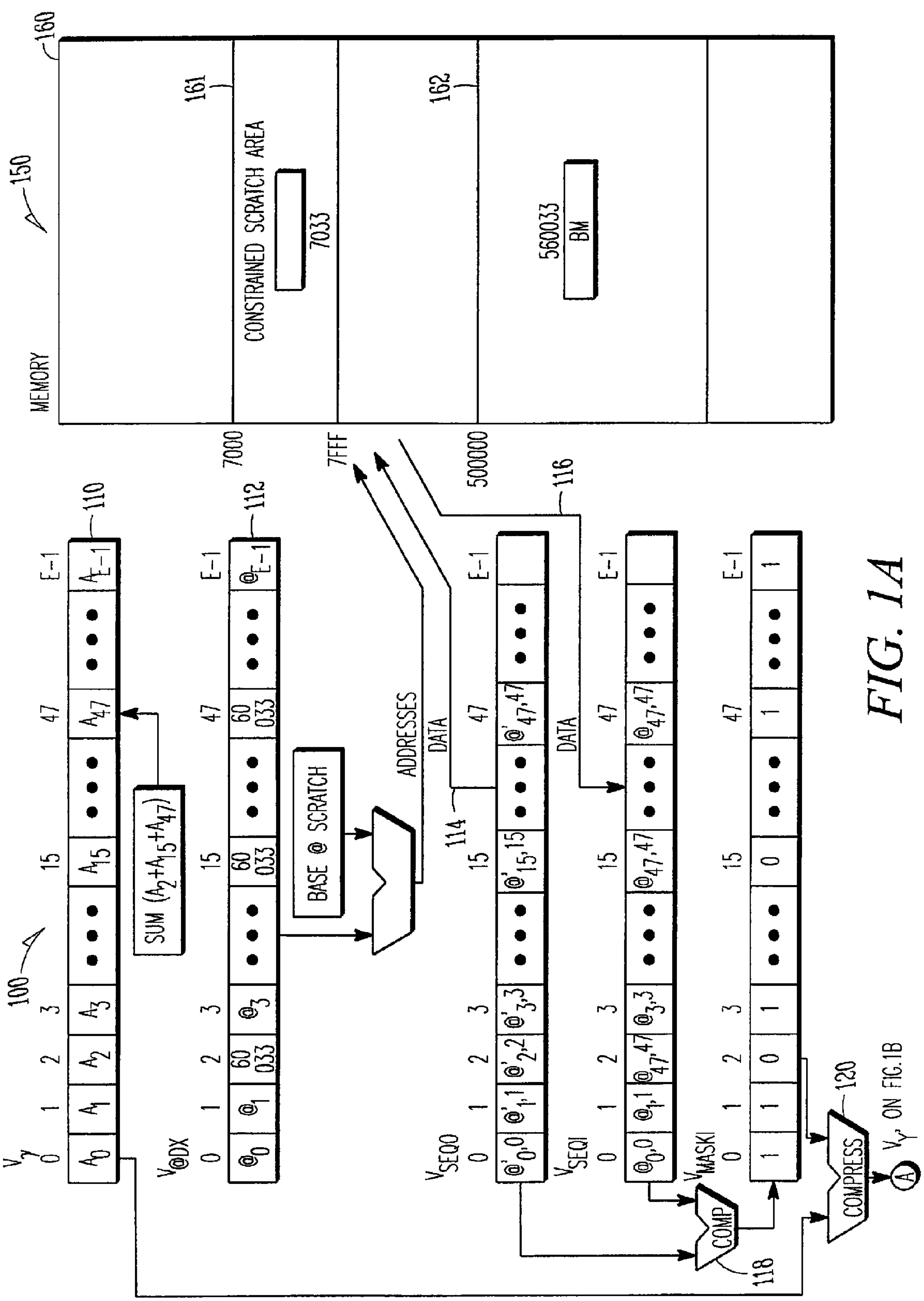
FIG. 1A shows a block diagram of one embodiment of the present invention having a vector processing system 100.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. The same reference number or label may refer to signals and connections, and the actual meaning will be clear from its use in the context of the description.

In some embodiments, there is a software application invention that requires that particular sequence of operations to maintain order. The algorithm itself has been vectorized. There is a requirement that within a vector of more than one element, since there may be collisions in the memory system where its referencing the same memory location multiple times in the vector. There needs to be a guarantee that updates to that memory location are done in order. In some embodiments, each memory location is an 8-byte memory location. In some embodiments, there is a vector instruction that can operate on multiple 8 byte quantities in one instruction, by using one vector register to hold addresses of the elements to be loaded into another vector register, that may not be contiguous in memory. In fact in this particular case they are often not contiguous.

Memory location can be referenced with a single instruction. But there may be multiple occurrences of any given memory address in that single instruction and now we're trying to do like an add of a value to that memory location. And when an addition operation occurs multiple times, there is the possibility of losing one of the adds or getting the adds out-of-order. This has been a known vectorization problem.

There are generally three instructions of interest. There is a load operation which loads the existing memory contents or a number of elements greater than one, into a vector register using indirect addressing. Then there's an add operation that wants to add a set of values to those elements that are loaded, such as V1 is assigned V2 plus V1. Then we want to store the result back out into the same memory location. And if the memory locations are all disjoint, this can occur at full speed in the vector hardware of FIG. 1D described below. The problem occurs, for which this special algorithm is needed, is when there are overlapping or multiple occurrences of the same memory location in the vector register used for addressing. The original values are loaded into v1. Now we add v2 to v1. In conventional methods, the first element that has multiple instances of the address is correct, but the additions after that are or can be incorrect because they lose the previous additions. So when we store the final result of the add back out to memory, we get an incorrect answer in memory. Thus, we need a method to recognize where the conflicting memory locations are, and we have such an algorithm for older systems, and part of the application is probably going to have to describe that old algorithm. And then for the X1 that old algorithm did not work very well, the present invention provides a new way of detecting those collisions.

In one conventional algorithm, after you did that load from memory, you would use the same memory location to store back a known pattern and then you would load back that pattern and do a comparison against the original pattern and if they matched then there were no collisions. But if they didn't match that means that one or more locations, or that a location had more than one store into it.

The other vector register specifies an index to those locations. And it's those indexes that may be repeated. That index is used both for the load as well as the store back later.

In the old way what you'd do is you'd have a pattern of say 1,2,3,4,5,6,7 in the elements and if you didn't get back, if you got 1,2,2 or 1,6,6. You would see where there was a collision and which elements were colliding. Then you unwrap the vector and do it as individual instructions. Effectively that's the conventional algorithm. The intent is to have a fast way of detecting that we do have a collision. The new algorithm, instead of using the original array that we loaded, storing this 1,2,3,4,5 etc., creates a temporary scratch array and uses that instead.

In fact, one can delay the load of the elements to be added, since the calculations to determine duplicates only needs the scratch area and the addressing vector register. The algorithm selects a certain number of bits out of the index vector elements, like say 12 bits, it doesn't really matter how many bits, and use that reduced index of the index into the temporary. Occasionally you get some false positives. The new algorithm addresses how to deal with the false positives. And does it in such a way that performance is improved on the X1 with this new technique.

The new algorithm goes on, instead of doing an add like the old algorithm did, it does an add back into the add-in values having duplicated indexes to compress that vector.

Figure 1B:
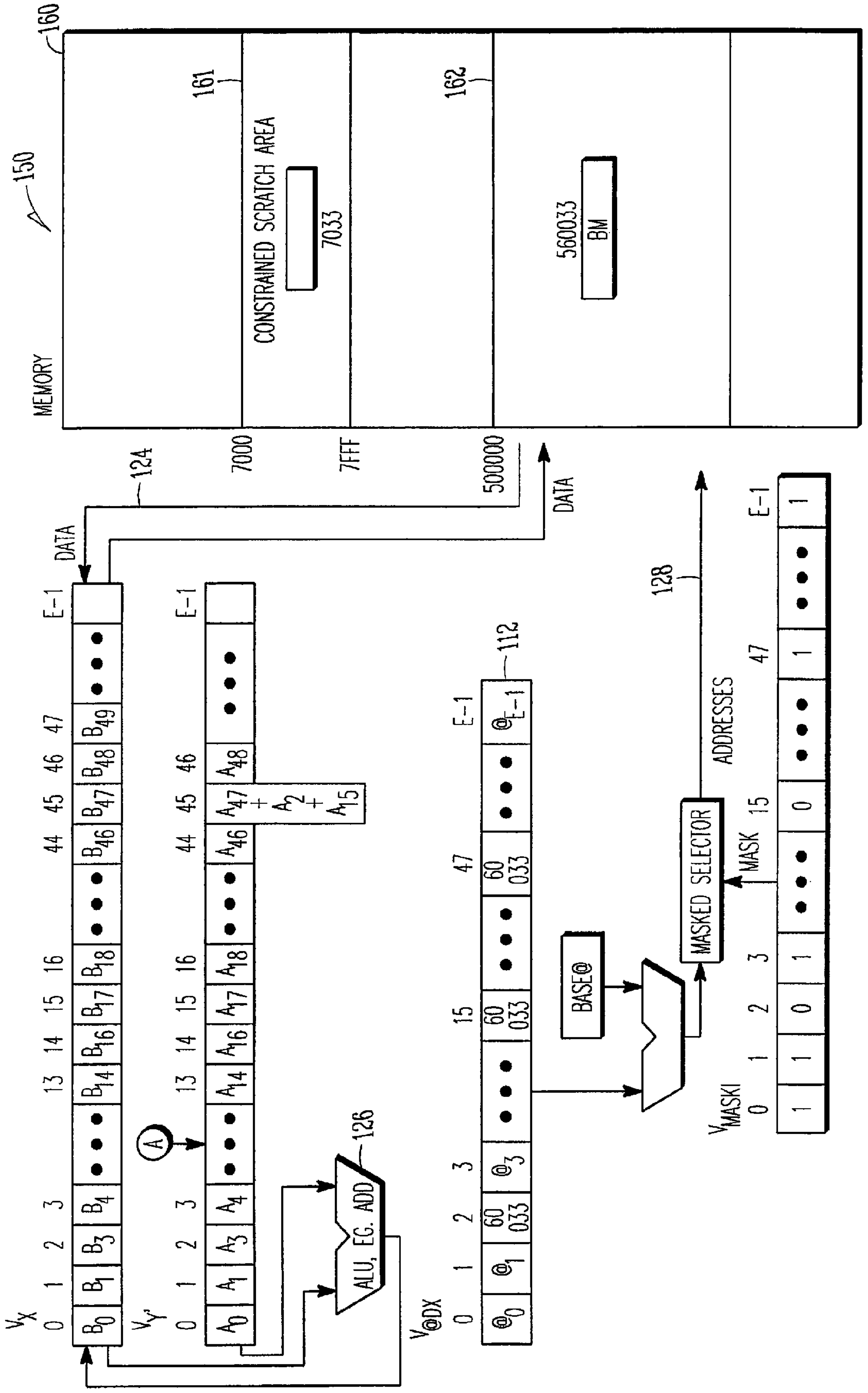
FIG. 1B shows a block diagram of further aspects of vector processing system 100.

FIG. 1A shows a block diagram of one embodiment of the present invention having a vector-processing system 100. FIG. 1B shows a block diagram of further aspects of vector processing system 100.

In some embodiments, as shown in FIGS. 1A and 1B, a first vector register 110 having E elements is loaded with the "add-in" values A0, A1, . . . A(E-1) into element addresses 0, 1, . . . (E-1) of register 110 (i.e., each element of the first vector register 110 is a different value to be added to a corresponding element fetched from memory), and a second vector register 112 is loaded with address values @0, @1, . . . @(E-1)(i.e., each element of the second vector register 112 is a different signed offset value to be added to a base address pointer to obtain the virtual address of the corresponding element fetched from memory) of "add to" elements to be gathered from memory 150 (e.g., from a table). Memory 150 includes memory areas 160, 161 and 162.

Occasionally, a plurality of such addresses will be equal, thus specifying to fetch the same "add to" element to a plurality of locations in the add-to vector register 110. For example, elements 2, 15, and 47 (these are the element addresses of elements in the vector) of the second register 112 might all have the same offset, say 60033, and the base register could have the pointer to, say address 500000. Thus, the addresses of elements 2, 15, and 47 would each point to memory address 560033. The elements 2, 15, and 47 of the "add to" vector 110 would all be loaded with the value from memory address 5033.

In some embodiments, the desired algorithm would want the same behavior and the same result whether the gather-add-scatter operations were performed one element at a time, 16 elements at a time, 64 elements at a time, or any other number of elements at a time, and regardless of the alignment of the gathered elements relative to the start of any vector operation. Thus, in this example, the value starting in memory address 560033 would be loaded (in a vector "gather" operation), be added to the "add in" values from elements 2, 15, and 47 of the first vector register 110, and this combined result would be stored back to memory location 560033 (in a "scatter" operation). In some embodiments, this provides the same result as if the value starting in memory address 560033 would be loaded (in a serial "gather" operation), be added to the "add in" value from element 2 of the first vector register 110, and stored back to memory location 560033, then this value from memory address 560033 would be again loaded, be added to the "add in" value from element 15 of the first vector register 110, and stored back to memory location 560033, and then this value from memory address 560033 would be again loaded, be added to the "add in" value from element 47 of the first vector register 110, and stored back to memory location 560033.

Since the identities of the elements in the second vector register 112 having the same addresses are unknown, the present invention provides a way to determine those elements. In some embodiments, a first sequence of identification values is stored to a series of addressed locations within a constrained area of memory 161. The address of each location used to store the sequence of values in the constrained area 161 is based at least in part on a corresponding one of the addressing values. For example, the constrained area could have $2^N$ locations (e.g., in some embodiments, $2^N=2^{12}=4096$ locations), and N bits (e.g., N=12 bits) of the address value are used as an offset into the constrained area. Continuing with the above example, the address offset 60033 could have any 12 bits extracted. Assume, for example, the low 12 bits are used, which would extract "033" from the 60033 value, assuming hexadecimal number notation. If the constrained area 161 had a base address of 7000, then the location 7033 would be the destination of the identification values for elements 2, 15, and 47, and since they are written in element order, location 7033 would end up with the value stored for element 47.

The method then reads back 116 from the sequence of addressed locations values resulting from the storing of the first sequence to obtain a second sequence of values, comparing 118 the first sequence of values to the second sequence of values to generate a bit vector representing compares and miscompares, compressing 120 the second vector of operand values using the bit vector, using the first vector of addressing values as masked by the bit vector. I.e., for an add operation, where the redundantly addressed locations point to a single memory value B (m) (i.e., at location 560033), each of the corresponding A elements 2, 15, and 47 are added to that Bm value and the result is stored to location 56033). The method further includes loading 124 a third vector register with elements from memory, performing 126 an arithmetic-logical operation using values from the third vector register and the compressed second vector of operand values to generate a result vector, and using the first vector of addressing values as masked by the bit vector, storing 128 the result vector to memory.

One exemplary program that codes one embodiment of the invention is listed below.

Figure 1C:
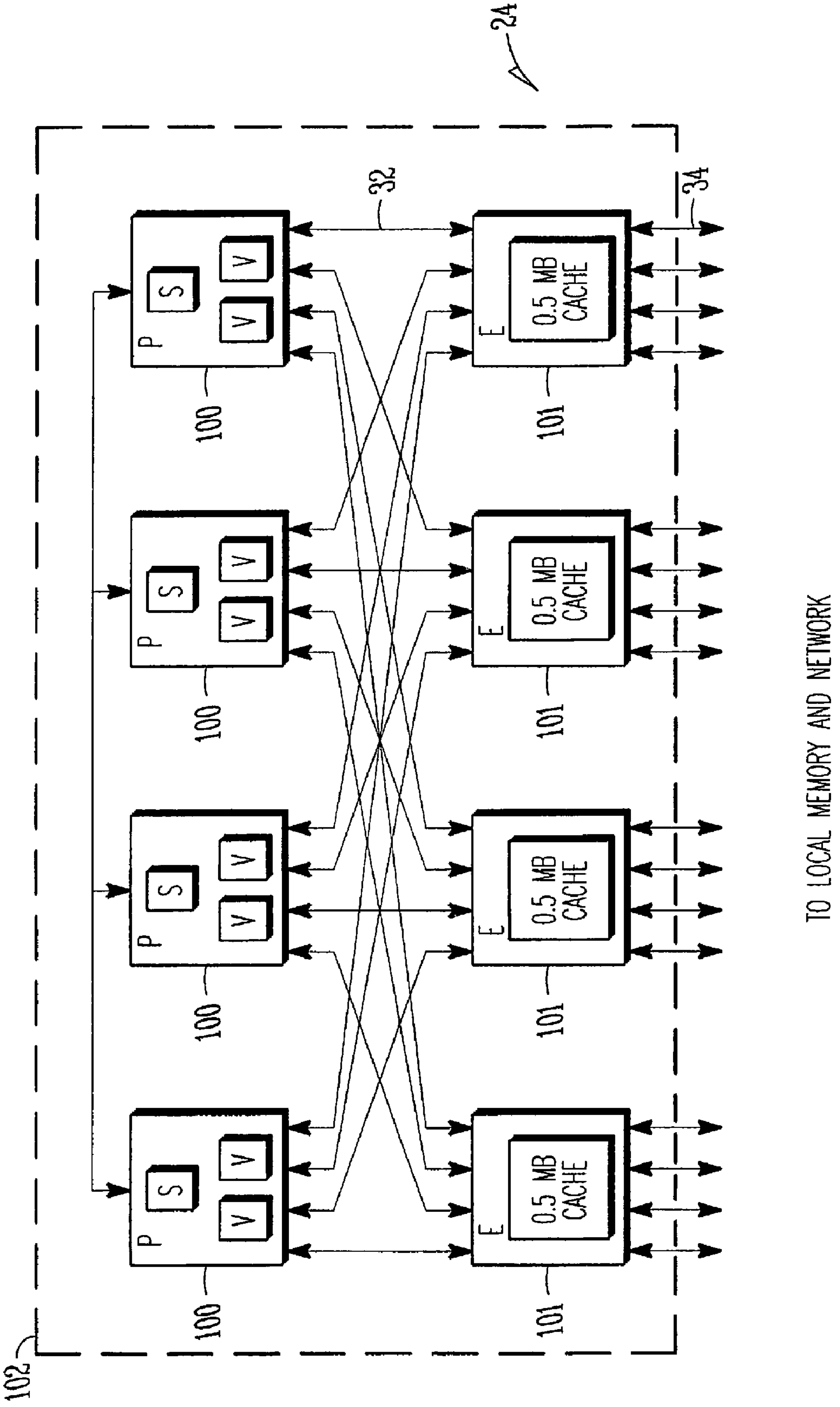
FIG. 1C shows a block diagram of an MSP 102 of some embodiments of the present invention.

FIG. 1C shows a block diagram of a multistreaming processor (MSP) 102 that is usable by the above method, for some embodiments of the present invention. MSP 102 includes a plurality of P chips or P circuits 100 (each representing one single-streaming processor having a plurality of vector pipelines and a scalar pipeline), each P chip/circuit 100 connected to a plurality of E chips or E circuits 101 (each representing an external cache, synchronization, and memory-interface function). In some embodiments, every P chip/circuit 100 is connected to every E chip/circuit 101. In some embodiments, four P Chips 100 and four E Chips 101 form one MSP 102. Although the P Chip 100 and the E Chips 101 are sometimes described herein as "chips" as representing one embodiment, in other embodiments, they are implemented with a plurality of chips each, or with a single chip containing a plurality of P circuits 100 and/or E circuits 101.

In some embodiments, each scalar processing unit 12 delivers a peak of 0.4 GFLOPS and 0.8 GIPS at the target frequency of 400 MHz. Each processor 100 contains two vector pipes, running at 800 MHz, providing 3.2 GFLOPS for 64-bit operations and 6.4 GFLOPS for 32-bit operations. The MSP 102 thus provides a total of 3.2 GIPS and 12.8/25.6 GFLOPS. Each processor 100 contains a small Dcache used for scalar references only. A two-MB Ecache 24 is shared by all the processors 100 in MSP 102 and used for both scalar and vector data. In one embodiment, each processor 100 and e-circuit 101 of cache 24 are packaged as separate chips (termed the "P" chip and "E" chips, respectively).

In some embodiments, signaling between processor 100 and cache 24 runs at 400 Mb/s on processor-to-cache connection 32. Each processor-to-cache connection 32 shown in FIG. 1C uses an incoming 64-bit path for load data and an outgoing 64-bit path for requests and store data. Loads, in some embodiments, can achieve a maximum transfer rate of fifty-one GB/s from cache 24. Stores, in some embodiments, can achieve up to forty-one GB/s for stride-one and twenty-five GB/s for non-unit stride stores.

In some embodiments, global memory 26 is distributed to each MSP 102 as local memory 105. Each E Chip 101 has four ports 34 to M chip 104 (and through M chip 104 to local memory 105 and to the network). In some embodiments, ports 34 are sixteen data bits in each direction. MSP 102 has a total of 25.6 GB/s load bandwidth and 12.8-20.5 GB/s store bandwidth (depending upon stride) to local memory.

Figure 1D:
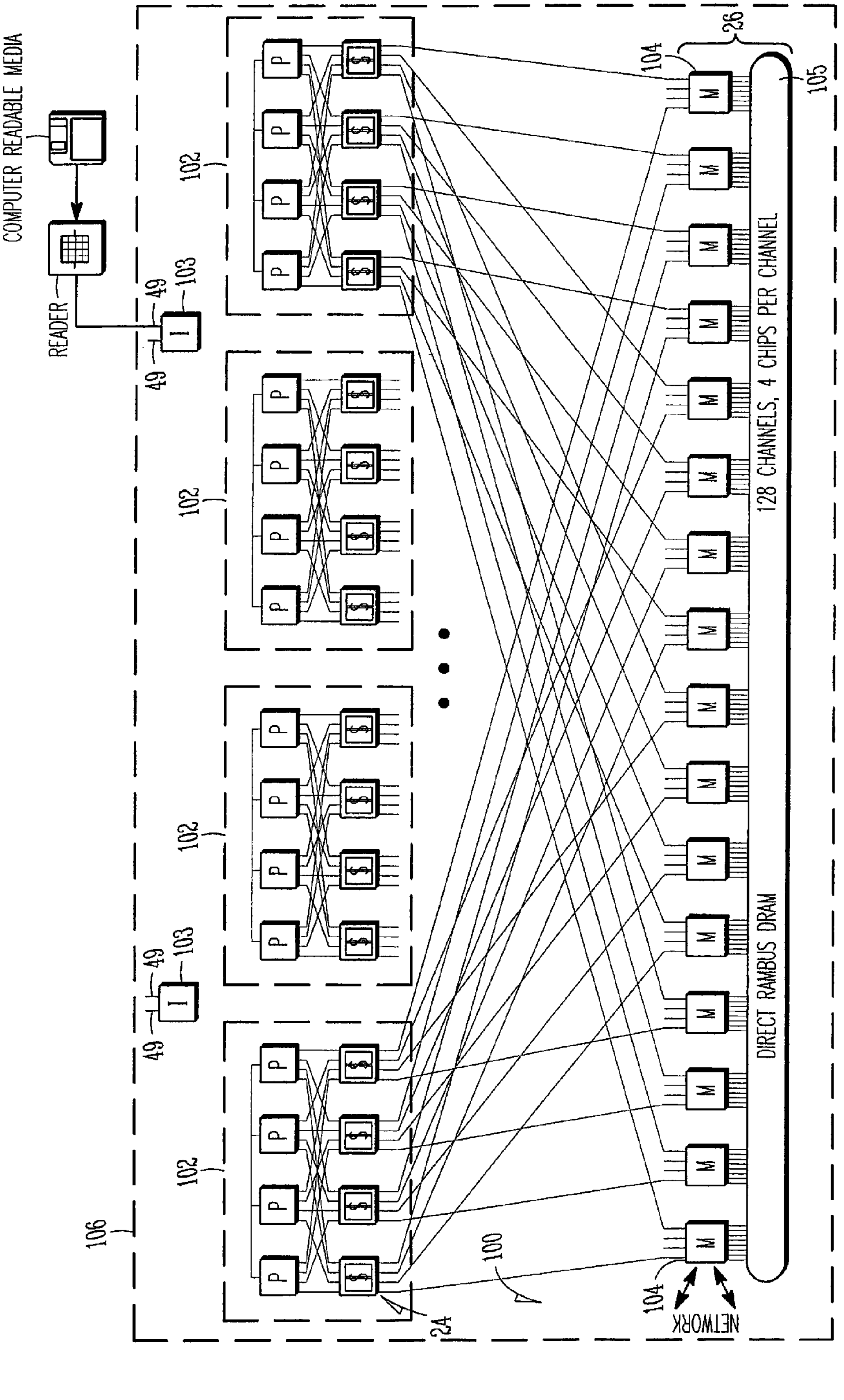
FIG. 1D shows a block diagram of a node 106 of some embodiments of the present invention.

FIG. 1D shows a block diagram of a node 106 of some embodiments of the present invention. In some embodiments, a node 106 is packaged on a single printed-circuit board. Node 106 includes a plurality of MSPs 102 each connected to a plurality of M chips 104, each M-chip 104 controlling one or more sections of memory 105. In some embodiments, each M chip 104 is connected to memory 105 using a plurality of channels (e.g., eight), each channel having a plurality of direct RAMBUS DRAM chips (e.g., four). In some embodiments, each node also includes a plurality of I/O channels 103 used to connect to a local-area network (e.g., one or more gigabit ethernet connections) and/or storage (e.g., disk storage or a storage-area network). Each node 106 also includes one or more network connections that interconnect the memories of a plurality of nodes, in some embodiments.

In some embodiments, each node 106 includes four MSPs 102 and sixteen M chips 104. M chips 104 contain memory controllers, network interfaces and cache coherence directories with their associated protocol engines. In one such embodiment, memory 26 is distributed round-robin by 32-byte cache lines across the sixteen M chips 104 at each node 106. Thus, the M chip for a particular address is selected by bits 8.5 of the physical address.

Each E Chip 101 is responsible for one fourth of the physical address space, determined by bits 5 and 6 of the physical address. A reference to a particular line of memory is sent to the associated E Chip 101 where the Ecache is consulted, and either the line is found in the Ecache or the request is sent on to an M chip. Bits 7 and 8 of the physical address select one of four M chips connected to each E Chip 101.

Each M chip 104 resides in one of sixteen independent slices of the machine, and the interconnection network provides connectivity only between corresponding M chips on different nodes (thus there are sixteen parallel, independent networks). All activity (cache, memory, network) relating to a line of memory stays within the corresponding system slice.

Each M chip 104 contains two network ports 44, each 1.6 GB/s peak per direction. This provides a total peak network bandwidth of 51.2 GB/s in and 51.2 GB/s out. Single transfers to/from any single remote destination will use only half this bandwidth, as only one of two ports 44 per M chip 104 will be used. Also, contention from the other processors 100 on node 106 must be considered. Lastly, all inter-node data is packetized, resulting in a smaller ratio of sustained to peak than in the local memory subsystem. Protocol overheads vary from 33% (one way, stride-1 reads) to 83% (symmetric, non-unit-stride reads or writes).

Each node 106 also contains two I/O controller chips 103 ("I" chips) that provide connectivity between the outside world and the network and memory 26. In some embodiments, each "I" chip 103 provides two XIO (a.k.a. Crosstalk) I/O channels 49, with a peak speed bandwidth of 1.2 GB/s full duplex each. The I chips are connected to each other and to the sixteen M chips 104 with enough bandwidth to match the four XIO channels.

This partitioning provides low latency and high bandwidth to local memory 105. With a local memory size of up to sixteen GB (sixty-four GB, once 1 Gbit chips become available), most single-processor and autotasked codes should run locally, and most references in distributed-memory codes will be satisfied locally as well. Latency to remote memory will depend upon the distance to the remote node, and the level of contention in the network.

In some embodiments, a limited operating system executes on each node, with a Unicos/mk-like layer across nodes 106. The limited OS will provide basic kernel services and management of two direct-attached I/O devices (a disk array and network interface). All other I/O connectivity is provided by a separate host system. In one such embodiment, the host system also provides the user environment (shell, cross compilers, utility programs, etc.), and can be used to run scalar compute applications.

Figure 1E:
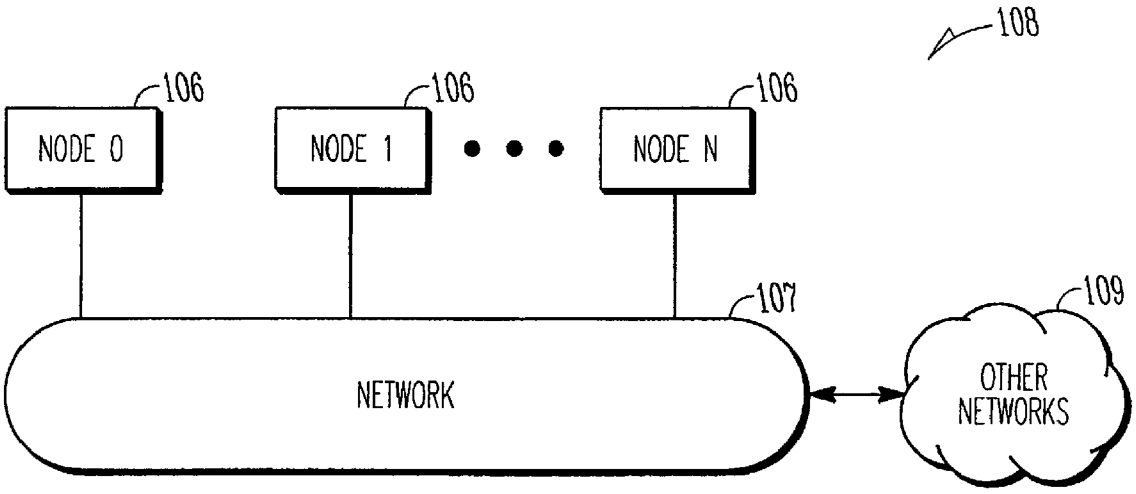
FIG. 1E shows a block diagram of a system 108 of some embodiments of the present invention.

FIG. 1E shows a block diagram of a system 108 of some embodiments of the present invention. System 108 includes a plurality of nodes 106 each connected to a common network 107. In some embodiments, network 107 is also connected to one or more other networks 109.

One aspect of the invention provides a computerized method that includes providing a first vector 110 of addressing values, providing a second vector 112 of operand values, storing 114 a first sequence of values to a sequence of addressed locations within a constrained area of memory, wherein each location's address is based at least in part on a corresponding one of the addressing values, reading back 116 from the sequence of addressed locations values resulting from the storing of the first sequence to obtain a second sequence of values, comparing 118 the first sequence of values to the second sequence of values to generate a bit vector representing compares and miscompares, compressing 120 the second vector of operand values using the bit vector, using the first vector of addressing values as masked by the bit vector, loading 124 a third vector register with elements from memory, performing 126 an arithmetic-logical operation using values from the third vector register and the compressed second vector of operand values to generate a result vector, and using the first vector of addressing values as masked by the bit vector, storing 128 the result vector to memory.

In some embodiments, addresses of the elements in memory are calculated by adding each respective addressing value to a base address of an object in memory.

In some embodiments, the arithmetic-logical operation is an addition operation that produces at least one element of the result vector as a summation of an element of the loaded third vector register and a plurality of respective elements of the original second vector of operand values corresponding to elements of the first vector of addressing values that had identical values.

In some embodiments, address values for the sequence of addressed locations within the constrained area of memory are each calculated using a truncated portion of each respective addressing value of the first vector of addressing values. In some embodiments, data values of the first sequence of values are each formed by concatenating a portion of each respective addressing value of the first vector of addressing values to a respective one of a sequence of numbers.

In some embodiments, the constrained area of memory includes $2^N$ locations, wherein address values for the sequence of addressed locations within the constrained area of memory are each calculated by adding a base address to an N-bit portion of each respective addressing value of the first vector of addressing values, and wherein data values of the first sequence of values are each formed by concatenating a portion of each respective addressing value of the first vector of addressing values to a respective one of a consecutive sequence of integer numbers.

In some embodiments, for the loading of the third vector register with elements from memory, elements are loaded from locations specified by addressing values corresponding to bits of the bit vector that indicated a compare and no elements are loaded from locations specified by addressing values corresponding to bits of the bit vector that indicated a miscompare.

In some embodiments, the operations recited therein are executed in the order recited therein.

Some embodiments, further include performing 124 a first synchronization operation that ensures that the comparing the first sequence of values to the second sequence of values to generate the bit vector representing compares and miscompares effectively completes before the loading of the third vector register with elements from memory, and performing 130 a second synchronization operation that ensures that the storing the result vector to memory completes before subsequent passes through a loop.

Another aspect of the invention provides a computer-readable medium having instructions stored thereon for causing a suitably programmed information-processing system to execute a method that includes providing 110 a first vector of addressing values, providing 112 a second vector of operand values, storing 114 a first sequence of values to a sequence of addressed locations within a constrained area of memory, wherein each location's address is based at least in part on a corresponding one of the addressing values, reading back 116 from the sequence of addressed locations values resulting from the storing of the first sequence to obtain a second sequence of values, comparing 118 the first sequence of values to the second sequence of values to generate a bit vector representing compares and miscompares, compressing 120 the second vector of operand values using the bit vector, using the first vector of addressing values as masked by the bit vector, loading 124 a third vector register with elements from memory, performing 126 an arithmetic-logical operation using values from the third vector register and the compressed second vector of operand values to generate a result vector, and using the first vector of addressing values as masked by the bit vector, storing 128 the result vector to memory.

Yet another aspect of the invention provides a computerized method that includes loading a first vector register with addressing values, loading a second vector register with operand values, storing a first sequence of values to a sequence of addressed locations within a constrained area of memory, wherein each one of these location's addresses in the constrained area of memory is based at least in part on a subset of bits of a corresponding one of the addressing values, reading back from the sequence of addressed locations values resulting from the storing of the first sequence to obtain a second sequence of values, comparing the first sequence of values to the second sequence of values, selectively combining, with an arithmetic-logical operation, certain elements of the second vector of operand values based on results of the comparing, using at least some of the first vector register of addressing values, loading a third vector register with elements from memory, performing the arithmetic-logical operation using values from the third vector register and the combined second vector of operand values to generate a result vector, and using the at least some of the first vector register of addressing values, storing the result vector to memory.

In some embodiments, addresses of the elements from memory are calculated by adding each respective addressing value to a base address.

In some embodiments, addresses of the elements from memory are calculated by performing a signed-addition operation of each respective addressing value to a base address of an object in memory.

In some embodiments, the arithmetic-logical operation is an addition operation that produces at least one element of the result vector as a summation of an element of the loaded third vector register and a plurality of respective elements of the original second vector of operand values corresponding to elements of the first vector register of addressing values having identical values.

In some embodiments, address values for the sequence of addressed locations within the constrained area of memory are each calculated using a truncated portion of each respective addressing value of the first vector register of addressing values.

In some embodiments, data values of the first sequence of values are each formed by concatenating a portion of each respective addressing value of the first vector register of addressing values to a respective one of a sequence of numbers.

In some embodiments, the constrained area contains $2^N$ consecutive addresses, wherein address values for the sequence of addressed locations within the constrained area of memory are each calculated using an N-bit value derived from each respective addressing value of the first vector register of addressing values, and wherein data values of the first sequence of values are each formed by concatenating a portion of each respective addressing value of the first vector register of addressing values to a respective one of a consecutive sequence of integer numbers.

In some embodiments, for the loading of the third vector register with elements from memory, elements are loaded from locations specified by addressing values corresponding to indications that indicated compares and no elements are loaded from locations specified by addressing values corresponding to indications that indicated miscompares.

Another aspect of the invention provides a computer-readable medium having instructions stored thereon for causing a suitably programmed information-processing system to execute one or more of the various embodiments of the above method.

In some embodiments, the constrained area contains $2^N$ consecutive addresses, address values for the sequence of addressed locations within the constrained area of memory are each calculated using an N-bit value derived from each respective addressing value of the first vector register of addressing values, data values of the first sequence of values are each formed by combining at least a portion of each respective addressing value of the first vector register of addressing values to a respective one of a consecutive sequence of integer numbers, for the loading of the third vector register with elements from memory, elements are loaded from locations specified by addressing values corresponding to indications that indicated compares and no elements are loaded from locations specified by addressing values corresponding to indications that indicated miscompares, addresses of the elements from memory are calculated by adding each respective addressing value to a base address, the arithmetic-logical operation is a floating-point addition operation that produces at least one element of the result vector as an ordered-operation floating point summation of an element of the loaded third vector register and a plurality of respective elements of the original second vector of operand values corresponding to elements of the first vector register of addressing values having identical values, and for the storing of the result vector of elements to memory, elements are stored to locations specified by addressing values corresponding to indications that indicated compares and no elements are stored to locations specified by addressing values corresponding to indications that indicated miscompares.

Another aspect of the invention provides a system that includes a first vector processor having a first vector register having addressing values, a second vector register having operand values, a third vector register, a bit vector register, circuitry that selectively stores a first sequence of values to a sequence of addressed locations within a constrained area of memory, wherein each location's address is based at least in part on a corresponding one of the addressing values, circuitry that selectively loads, from the sequence of addressed locations, values resulting from the stores of the first sequence to obtain a second sequence of values, circuitry that selectively compares the first sequence of values to the second sequence of values to generate bit values into the bit vector register representing compares and miscompares, circuitry that selectively compresses the second vector of operand values using the values in the bit vector register, circuitry that selectively loads the third vector register with elements from memory addresses generated from the first vector register of addressing values as masked by the bit vector register, circuitry that selectively performs an arithmetic-logical operation on corresponding values from the third vector register and the compressed second vector of operand values to generate values of a result vector, and, circuitry that selectively stores the result vector to memory.

Some embodiments of this system further include circuitry to calculate addresses of the elements in memory by adding each respective addressing value to a base address value.

In some embodiments of this system, the arithmetic-logical operation is an addition operation that produces at least one element of the result vector as a summation of an element of the loaded third vector register and a plurality of respective elements of the original second vector of operand values corresponding to elements of the first vector register of addressing values that had identical values.

Some embodiments of this system further include circuitry to calculate address values for the sequence of addressed locations within the constrained area of memory using a truncated portion of each respective addressing value of the first vector register of addressing values.

Some embodiments of this system further include circuitry to generate data values of the first sequence of values by joining a portion of each respective addressing value of the first vector register of addressing values to a respective one of a sequence of numbers.

Some embodiments of this system further include circuitry to generate address values of the sequence of addressed locations within the constrained area of memory by adding a base address to an N-bit portion of each respective addressing value of the first vector register of addressing values, and circuitry to generate data values of the first sequence of values by combining a portion of each respective addressing value of the first vector register of addressing values with a respective one of a consecutive sequence of integer numbers.

In some embodiments, the circuitry that selectively loads the third vector register with elements from memory only loads element from locations specified by addressing values corresponding to bits of the bit vector that indicated a compare.

Some embodiments further include synchronization circuitry that ensures that the comparing the first sequence of values to the second sequence of values to generate the bit vector representing compares and miscompares effectively completes before the loading of the third vector register with elements from memory, and that ensures that the storing the result vector to memory completes before subsequent passes through a loop.

Some embodiments further include a second vector processor having: a first vector register having addressing values, a second vector register having operand values, a third vector register, a bit vector register, circuitry that selectively stores a first sequence of values to a sequence of addressed locations within a constrained area of memory, wherein each location's address is based at least in part on a corresponding one of the addressing values, circuitry that selectively loads, from the sequence of addressed locations, values resulting from the stores of the first sequence to obtain a second sequence of values, circuitry that selectively compares the first sequence of values to the second sequence of values to generate bit values into the bit vector register representing compares and miscompares, circuitry that selectively compresses the second vector of operand values using the values in the bit vector register, circuitry that selectively loads the third vector register with elements from memory addresses generated from the first vector register of addressing values as masked by the bit vector register, circuitry that selectively performs an arithmetic-logical operation on corresponding values from the third vector register and the compressed second vector of operand values to generate values of a result vector, and, circuitry that selectively stores the result vector to memory. This system also includes synchronization circuitry that ensures that the comparing the first sequence of values to the second sequence of values to generate the bit vector representing compares and miscompares effectively completes in both the first and second vector processors before the loading of the third vector register with elements from memory in either processor, and that ensures that the storing the result vector to memory completes before subsequent passes through a loop.

Another aspect of the invention provides a system that includes a first vector register, a second vector register, a third vector register, a bit vector register, means for loading the first vector register with addressing values, means as described herein for loading the second vector register with operand values, means for storing a first sequence of values to a sequence of addressed locations within a constrained area of memory, wherein each one of these location's addresses in the constrained area of memory is based at least in part on a subset of bits of a corresponding one of the addressing values, means for loading from the sequence of addressed locations values resulting from the storing of the first sequence to obtain a second sequence of values, means for comparing the first sequence of values to the second sequence of values, means for selectively combining, with an arithmetic-logical operation, certain elements of the second vector of operand values based on results of the comparing, means for loading a third vector register with elements from memory address locations generated using at least some of the first vector register of addressing values, means for performing the arithmetic-logical operation using values from the third vector register and the combined second vector of operand values to generate a result vector, and means for storing the result vector to memory.

Another aspect of the invention provides a system including a first vector register that can be loaded with addressing values, a second vector register that can be loaded with operand values, a third vector register that can be loaded with operand values from memory locations indirectly addressed using the addressing values from the first vector register, a circuit that determines element addresses of the first vector register that have a value that duplicates a value in another element address, a circuit that selectively adds certain elements of the second vector of operand values based on the element addresses the duplicated values, a circuit that uses indirect addressing to selectively load the third vector register with elements from memory, a circuit that selectively adds values from the third vector register and the second vector of operand values to generate a result vector, and a circuit that selectively stores the result vector to memory using indirect addressing.

Some embodiments of this system further include an adder that generates addresses of the elements from memory by adding each respective addressing value to a base address.

Some embodiments of this system further include an adder that generates addresses of the elements from memory by a signed-addition operation of each respective addressing value to a base address of an object in memory.

In some embodiments, the circuit that selectively adds certain elements performs one or more addition operations using those values from a plurality of respective elements of the original second vector of operand values corresponding to elements of the first vector register of addressing values having identical values.

Multistreaming Aspects of Indirect Addressed Vector Add

Another aspect of the invention provides a computerized method that includes loading a first vector register with addressing values, loading a second vector register with operand values, determining which, if any, element addresses of the first vector register have a value that duplicates a value in another element address, selectively adding certain elements of the second vector of operand values based on the element addresses the duplicated values, loading, using indirect addressing from the first vector register, elements from memory into a third vector register, adding values from the third vector register and the second vector of operand values to generate a result vector, and storing the result vector to memory using indirect addressing.

In some embodiments, the set of operations (a), (b), (c), and (d) is performed substantially in parallel in the plurality of processors, and the set of operations (e), (f), and (g) is performed serially, one processor at a time.

Some embodiments further include executing an ordered Msync operation before the set of operations (e), (f), and (g), and executing an end ordered Msync operation after the set of operations (e), (f), and (g).

In some embodiments, the set of operations (a), (b), (c), and (d) is performed substantially in parallel in the plurality of processors.

Some embodiments of the method further include:

- executing a first barrier synchronization operation before the set of operations (e), (f), and (g) in all of the plurality of processors,
- executing a second barrier synchronization operation before the set of operations (e), (f), and (g) in the second processor,
- executing the set of operations (e), (f), and (g) in the first processor and then executing a second barrier synchronization operation in the first processor to satisfy the second barrier synchronization in the second processor, and executing a third barrier synchronization in the first processor, and
- executing the set of operations (e), (f), and (g) in the second processor and then executing a third barrier synchronization operation in the second processor to satisfy the third barrier synchronization in the first processor.

In some embodiments, the set of operations (a), (b), (c), and (d) is performed substantially in parallel in the plurality of processors.

In some embodiments, the determining of duplicates includes:

- generating each respective address value for a sequence of addressed locations within a constrained area of memory containing $2^N$ consecutive addresses using an N-bit value derived from each respective addressing value of the first vector register,
- generating each respective data value of a first sequence of values by combining at least a portion of each respective addressing value of the first vector register to a respective one of a sequence of integer numbers,
- storing the first sequence of values to the constrained memory area using the generated sequence of respective address values,
- loading a second first sequence of values from the constrained memory area using the generated sequence of respective address values, and comparing the first sequence of values to the second sequence of values, and wherein the loading of the third vector register includes loading elements from locations specified by addressing values corresponding to indications of positive compares from the comparing, wherein addresses of the elements from memory are calculated by adding each respective addressing value to a base address, wherein the adding includes a floating-point addition operation that produces at least one element of the result vector as an ordered-operation floating point summation of an element of the loaded third vector register and a plurality of respective elements of the original second vector of operand values corresponding to elements of the first vector of addressing values having identical values, and wherein for the storing of the result vector of elements to memory, elements are stored to locations specified by addressing values corresponding to indications of positive compares.

Another aspect of the invention provides a computerized method that includes:

(a) within a first vector processor:
  - loading a first vector register in the first vector processor with addressing values,
  - loading a second vector register in the first vector processor with operand values,
  - determining which, if any, element addresses of the first vector register in the first vector processor have a value that duplicates a value in another element address,
  - selectively adding certain elements of the second vector of operand values in the first vector processor based on the element addresses the duplicated values, (b) within a second vector processor:
  - loading a first vector register in the second vector processor with addressing values,
  - loading a second vector register in the second vector processor with operand values,
  - determining which, if any, element addresses of the first vector register in the second vector processor have a value that duplicates a value in another element address,
  - selectively operating on certain elements of the second vector of operand values in the second vector processor based on the element addresses the duplicated values, (c) performing a synchronization operation that ensures that prior store operations effectively complete in at least the second vector processor before the following (d) operations, (d) within the first vector processor:
  - loading, using indirect addressing from the first vector register, elements from memory into a third vector register in the first vector processor,
  - operating on values from the third vector register and the second vector of operand values in the first vector processor to generate a first result vector, and
  - storing the first result vector to memory using indirect addressing.

(e) performing a synchronization operation that ensures that the storing of the first result vector effectively completes before the following (f) operations, and (f) within the second vector processor:
  - loading, using indirect addressing from the first vector register, elements from memory into a third vector register in the second vector processor,
  - operating on values from the third vector register and the second vector of operand values in the second vector processor to generate a second result vector, and
  - storing the second result vector to memory using indirect addressing.

In some embodiments, each of the "operating on" functions includes adding.

In some embodiments, the adding includes a floating-point addition operation that produces at least one element of the result vector as an ordered-operation floating point summation of an element of the loaded third vector register and a plurality of respective elements of the original second vector of operand values corresponding to elements of the first vector of addressing values having identical values.

In some embodiments, the determining of duplicates includes generating each respective address value for a sequence of addressed locations within a constrained area of memory containing $2^N$ consecutive addresses using an N-bit value derived from each respective addressing value of the first vector register, generating each respective data value of a first sequence of values by combining at least a portion of each respective addressing value of the first vector register to a respective one of a sequence of integer numbers, storing the first sequence of values to the constrained memory area using the generated sequence of respective address values, loading a second first sequence of values from the constrained memory area using the generated sequence of respective address values, and comparing the first sequence of values to the second sequence of values.

In some embodiments, the loading of the third vector register of each processor includes loading elements from locations specified by addressing values corresponding to indications of positive compares from the comparing operation.

In some embodiments, indirect addresses of the elements from memory are calculated by adding each respective addressing value to a base address.

One aspect of the invention provides a system that includes a first vector register having addressing values, a second vector register having operand values, circuitry programmed to determine which, if any, element addresses of the first vector register have a value that duplicates a value in another element address, circuitry programmed to selectively add certain elements of the second vector of operand values based on the element addresses the duplicated values, circuitry programmed to load, using indirect addressing from the first vector register, elements from memory into a third vector register, circuitry programmed to add values from the third vector register and the second vector of operand values to generate a result vector, and circuitry programmed to store the result vector to memory using indirect addressing.

In some embodiments, the circuitry programmed to determine duplicates further includes circuitry programmed to generate each respective address value for a sequence of addressed locations within a constrained area of memory containing $2^N$ consecutive addresses using an N-bit value derived from each respective addressing value of the first vector register, circuitry programmed to generate each respective data value of a first sequence of values by combining at least a portion of each respective addressing value of the first vector register to a respective one of a sequence of integer numbers, circuitry programmed to store the first sequence of values to the constrained memory area using the generated sequence of respective address values, circuitry programmed to load a second sequence of values from the constrained memory area using the generated sequence of respective address values, and circuitry programmed to compare the first sequence of values to the second sequence of values; and the circuitry programmed to load the third vector register loads elements from locations specified by addressing values corresponding to indications of positive compares; addresses of the elements from memory are calculated by adding each respective addressing value to a base address; and the circuitry programmed to add includes a floating-point adder that produces at least one element of the result vector as an ordered-operation floating point summation of an element of the loaded third vector register and a plurality of respective elements of the original second vector of operand values corresponding to elements of the first vector of addressing values having identical values.

Some embodiments further include circuitry programmed to perform the set of operations (a), (b), (c), and (d) substantially in parallel in the plurality of processors, and circuitry programmed to perform the set of operations (e), (f), and (g) serially, one processor at a time.

Some embodiments further include circuitry programmed to execute an ordered Msync operation before the set of operations (e), (f), and (g); and circuitry programmed to execute an end ordered Msync operation after the set of operations (e), (f), and (g). Some such embodiments further include circuitry programmed to perform the set of operations (a), (b), (c), and (d) substantially in parallel in the plurality of processors.

Some embodiments further include circuitry programmed to execute a first barrier synchronization operation before the set of operations (e), (f), and (g) in all of the plurality of processors, circuitry programmed to execute a second barrier synchronization operation before the set of operations (e), (f), and (g) in the second processor, circuitry programmed to execute the set of operations (e), (f), and (g) in the first processor and then executing a second barrier synchronization operation in the first processor to satisfy the second barrier synchronization in the second processor, and executing a third barrier synchronization in the first processor, and circuitry programmed to execute the set of operations (e), (f), and (g) in the second processor and then executing a third barrier synchronization operation in the second processor to satisfy the third barrier synchronization in the first processor. Some such embodiments further include circuitry programmed to perform the set of operations (a), (b), (c), and (d) substantially in parallel in the plurality of processors.

Another aspect of the invention provides a system that includes (a) a first vector processor including means as described herein for loading a first vector register in the first vector processor with addressing values, means for loading a second vector register in the first vector processor with operand values, means for determining which, if any, element addresses of the first vector register in the first vector processor have a value that duplicates a value in another element address, and means for selectively adding certain elements of the second vector of operand values in the first vector processor based on the element addresses the duplicated values; and (b) a second vector processor including means for loading a first vector register in the second vector processor with addressing values, means for loading a second vector register in the second vector processor with operand values, means for determining which, if any, element addresses of the first vector register in the second vector processor have a value that duplicates a value in another element address, means for selectively operating on certain elements of the second vector of operand values in the second vector processor based on the element addresses the duplicated values, (c) means for performing a synchronization operation that ensures that prior store operations effectively complete in at least the second vector processors before the operations of the following (d) means, (d) within the first vector processor: means for loading, using indirect addressing from the first vector register, elements from memory into a third vector register in the first vector processor, means for operating on values from the third vector register and the second vector of operand values in the first vector processor to generate a first result vector, and means for storing the first result vector to memory using indirect addressing;

(e) performing a synchronization operation that ensures that the storing of the first result vector effectively completes before the operations of the following (f) means, and (f) within the second vector processor:

means for loading, using indirect addressing from the first vector register, elements from memory into a third vector register in the second vector processor, means for operating on values from the third vector register and the second vector of operand values in the second vector processor to generate a second result vector, and means for storing the second result vector to memory using indirect addressing.

In some embodiments, each of the means for operating on functions includes an adder.

In some embodiments, wherein the adder includes a floating-point adder that produces at least one element of the result vector as an ordered-operation floating point summation of an element of the loaded third vector register and a plurality of respective elements of the original second vector of operand values corresponding to elements of the first vector of addressing values having identical values.

In some embodiments, wherein the means for determining of duplicates includes: means as described herein for generating each respective address value for a sequence of addressed locations within a constrained area of memory containing $2^N$ consecutive addresses using an N-bit value derived from each respective addressing value of the first vector register, means for generating each respective data value of a first sequence of values by combining at least a portion of each respective addressing value of the first vector register to a respective one of a sequence of integer numbers, means for storing the first sequence of values to the constrained memory area using the generated sequence of respective address values, means for loading a second first sequence of values from the constrained memory area using the generated sequence of respective address values, and means for comparing the first sequence of values to the second sequence of values.

In some embodiments, the means for loading of the third vector register of each processor includes means for loading elements from locations specified by addressing values corresponding to indications of positive compares from the comparing operation.

In some embodiments, indirect addresses of the elements from memory are calculated by adding each respective addressing value to a base address.

Another aspect of the invention provides a computer-readable medium having instructions stored thereon for causing a suitably programmed information-processing system to execute a method that includes loading a first vector register with addressing values, loading a second vector register with operand values, determining which, if any, element addresses of the first vector register have a value that duplicates a value in another element address, selectively adding certain elements of the second vector of operand values based on the element addresses the duplicated values, loading, using indirect addressing from the first vector register, elements from memory into a third vector register, adding values from the third vector register and the second vector of operand values to generate a result vector, and storing the result vector to memory using indirect addressing.

An iota instruction is described in U.S. Pat. No. 6,308,250, entitled "Method and Apparatus for Processing a Set of Data Values with Plural Processing Units Mask Bits Generated by Other Processing Units," issued Oct. 23, 2001 to Klausler, the description of which is incorporated herein by reference.

In some embodiments, a program such as the following example is used:

```
============================================================
/* kernel of the HMG tabletoy benchmark (with declarations) */
#define  LTABSIZE          22                    /* logarithm of table size (27) (22
for jobmix) */
#define  NRECGEN         100000                   /* records to generate on each
pass */
#define TAB__SIZE (1 << LTABSIZE)
double table[TAB__SIZE];
typedef struct
      {
          int index;
          double value;
      }update__t;
      update__t xdata[NRECGEN];
          ...
      /* the timed loop, recs__todo (input data) = 900000000 */
          while (recs__todo)
              {
                  nrec = MIN (recs__todo, NRECGEN);
                  recs__todo -= nrec;
                  for (idx = 0; idx < nrec; idx++)
                                      table[xdata[idx].index] += xdata[idx].value;
              }
/* Please note that there is NO ivdep on this loop. */
/* In some embodiments, change the inner update loop to:
      #pragma ivdep
                  for (idx = 0; idx < nrec; idx++)
                      table[xdata[idx].index]
                              += xpartred__add64(xdata[idx].value,xdata[idx].index);
/* in some embodiments, results were obtained by compiling with: */
/*    cc -o toy toy.c                                          */
/* and running with:                                           */
/*    aprun -n1 -p:16m toy 900000000                           */
============================================================
*   In some embodiments, the following assembly code is used for
the bolded instruction above:
*   HMG Tabletoy update:   table[xdata.index[i]] += xdata.value[i];
*   Registers computed or loaded during RHS processing of update...
                  v2      [a27,2],m0                ;IX = xdata.index[*]
                  v0      cidx(a11,m0)              ;IOTA
              m1      m0|m0               ;input mask
              v1      [a28,2],m0          ;Y = xdata.value[*]
*   Generate ordered msync wait,send masks
*
*   A10 = Remaining tripcount (after this pass)
*   A11 = 1
*   A22 = SSP#
*   A26 = SSP's array offset
              a24     a22^3               ;=0 iff P3
              a25     a0<a26              ;=0 iff P0 and 1st iter, else 1
              a24     a10|a24             ;=0 iff P3 and last iteration
              a21     a22-1
              a26     a0<a24              ;=0 iff P3 and no more iters, else 1
              a23     a22+1
              a21     a21&3               ;restrict shift counts to be 0..3
              a23     a23&3
              a22     a11<<a22            ;self-mask
              a21     a25<<a21            ;mask for SSP to wait on
              a23     a26<<a23            ;mask for SSP to send
              a21     a21|a22             ;wait mask
              a22     a22|a23             ;send mask
*   Inlined "indexed partial reduction" algorithm: Y',M1 =
reduce(Y, IX),M1
*
*   Y' will contain Y or sum reduced values of Y for duplicate IX
values;
*   M1 will contain an update mask where IX values are unique and
also where
```

-continued

```
*    the Y' elements that need to be added into the update (LHS)
vector.
*
*    Input:
*    v0 = IOTA vector (0,1,2,...,63)
*              v1 = Y vector
*              v2 = IX vector
*                   m1 = Input mask
*              v1 = #elements in v0, v1, v2
*
*    Output:
*              v1 = Y' vector
*              v2 = IX vector
*              m1 = Output mask of unique IX values
CNFXSZ              =         16384     ;Size of scratch conflict analysis
space
              s4       CNFXSZ-1
              a29      v1
              a45      CNFXSZ*8-8
              v5       v2&s4,m0         ;Conflict index set masked from ix
              m4       fill(a29)
              m3       m1&m4            ;Clear trailing mask bits beyond VL
              a20      CNFXSZ*8
              a45      a63-a45
              s28      8
              a63      a63-a20              ;Allocate private stack space
              v6       v2<<s28,m0       ;(ix<<8) to make room for IOTA
              v4       v6|v0,m0         ;(ix<<8)|IOTA
              a27      last(m4)         ;last valid element#
cnfxloop = *                            ;"False positive" conflict loop
              [a45,v5] v4,m3,ord            ;Scatter (ix<<8)|IOTA (to
scratch array)
              s27      x'00ff:d
              lsync    v,v
              v6       [a45,v5],m3      ;Gather (ix<<8) '|IOTA'
              v7       +v6>>s28,m3      ;Extract ix'
              m2       v7==v2,m3        ;M2 excludes ix's mapping to same
CNFX
              v9       v6&s27,m3        ;Element #s of y sums
              m4       v9!=v0,m2        ;Conflict map
              m3       ~m2&m3               ;Map of remaining ix values
              a6       1
              a29      pop(m4)              ;Conflict trip count (tc)
              v7       cmprss(v9,m4)        ;IOTA's that conflicts map to
              a26      pop(m3)              ;>0 if ix's mapped to same CNFX
              m1       ~m4&m1               ;Exclude conflicts in final M1
              a1       v7,0             ;1st iota into which to sum (iota1)
              a8       a6<a29               ;=1 if tc > 1
              v7,a29        a27             ;Store safe y sum index at end
              a6       a0<a29               ;=1 if tc > 0
              a7       a6+a8            ;=2 if tc > 1, else tc
              a2       v7,a6            ;2nd iota into which to sum (iota2)
              a3       v7,a7            ;3rd iota into which to sum (iota3)
              v8       cmprss(v1,m4)        ;y values to add into y sums
              bz       a29,noconflict       ;If no conflicts exist
              a11      v8,0             ;Get 1st 3 y values (y1,y2,y3)
              v8,a29        s0              ;Store 0 for conflict summing
at end
              a12      v8,a6
              s3       v8,a7
              $REPEAT                       ;Repeat 3 update fixes per
iteration
                   a5       a7<a29      ;=1 if >=0 more conflicts (another
iter)
                   s5       v1,a1           ;Get 3 y sums (to sum conflicts
into)
                   a23      a2^a1           ;Determine conflict:
iota2==iota1
                   a5       a7+a5
                   s6       v1,a2
                   a24      a3^a1           ;Determine conflict:
iota3==iota1
                   a15      a5<a29      ;=1 if >=1 more conflicts
                   s7       v1,a3
                   a25      a3^a2           ;Determine conflict:
iota3==iota2
                   a6       a5+a15
                   a16      a1          ;Save iota1
                   a1       v7,a5           ;Bottom load next iter's iota1
```

-continued

```
                    a7        a6<a29           ;=1 if >=2 more conflicts
                    a17       a2               ;Save iota2
                    a2        v7,a6                  ;Bottom load next iter's iota2
                    a7        a6+a7
                    a18       a3               ;Save iota3
                    a13       a11
                    s1        a11
                    a11       a24?a0:a11            ;y1 if iota3==iota1, else 0
                    a3        v7,a7                 ;Bottom load next iter's iota3
                    a13       a23?a0:a13            ;y1 if iota2==iota1, else 0
                    s2        a12
                    a12       a25?a0:a12            ;y2 if iota3==iota2 , else 0
                    s11       a11
                    a11       v8,a5                 ;Bottom load next iter's y1
                    s13       a13
                    s12       a12
                    a12       v8,a6                 ;Bottom load next iter's y2
                    s4,d              s3+s11        ;y3 += (iota3==iota1) ? y1 : 0
                    s3        v8,a7                 ;Bottom load next iter's y3
                    s2,d              s2+s13        ;y2 += (iota2==iota1) ? y1 : 0
                    s4,d              s4+s12        ;y3 += (iota3==iota2) ? y2 : 0
                    s5,d              s5+s1                   ;Sum1 += y1
                    s6,d              s6+s2                   ;Sum2 += y2 [+ y1]
                    s7,d              s7+s4                   ;Sum3 += y3 [+ y1] [+ y2]
                    v1,a16        s5
                    v1,a17        s6
                    v1,a18        s7
          $UNTIL                a15,Z
noconflict   =                  *                   ;Branch here if no conflicts
               bn        a26,cnfxloop               ;Repeat if more ix's mapped to
same CNFX
               a63       a63+a20                    ;Restore stack frame
*
*   End of inlined "indexed partial reduction" algorithm.
*
*   Update LHS using unique IX mask, M1, and non-allocating
gather/scatter.
*   Use ordered (ripple) msyncs if multistreamed.
*
               msync     a21,v                 ;Ordered msync
               v4        [a32,v2],m1,na             ;Gather TABLE[xdata.index[*]]
               v5,d      v4+v1,m1
               [a32,v2]       v5,m1,ord,na          ;scatter my updated TABLE
values
               msync     a22,v                 ;End ordered msync
```

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method of identifying duplicate values in a vector register, the method comprising:

loading addressing values into elements of a first vector register, wherein each of the addressing values is added to a first base address of a first memory area to calculate a corresponding location within the first memory area;

generating each respective address value for a sequence of addressed locations within a constrained memory area, wherein the constrained memory area includes $2^N$ consecutive addresses, wherein the addressed locations within the constrained memory area are addressed using an N-bit value derived from each respective addressing value of the first vector register, and wherein the constrained memory area is separate from and does not overlap the first memory area;

storing, into a second vector register, identifying data values that can be used to identify elements in the second vector register;

storing the identifying data values in the second vector register to the constrained memory area using the generated sequence of respective address values;

reading data values from the constrained memory area using the generated sequence of respective address values; and comparing the identifying data values in the second vector register to the data values read from the constrained memory area to identify duplicate values.

2. A computerized method comprising, in each of a plurality of processors including a first processor and a second processor:

loading a first vector register with addressing values and a second vector register with operand values, wherein each of the addressing values is added to a first base address of a first memory area to calculate a corresponding location within the first memory area;

identifying element addresses of the first vector register having a value that duplicates a value in another element address by:

generating each respective address value for a sequence of addressed locations within a constrained memory area, wherein the constrained memory area includes $2^N$ consecutive addresses, wherein the addressed locations within the constrained memory area are addressed using an N-bit value derived from each respective addressing value of the first vector register, and wherein the constrained memory area is separate from and does not overlap the first memory area;

loading, into a third vector register, identifying data values that can be used to identify elements in the third vector register;

storing the identifying data values in the third vector register to the constrained memory area using the generated sequence of respective address values;

reading data values from the constrained memory area using the generated sequence of respective address values; and comparing the identifying data values in the third vector register to the data values read from the constrained memory area to identify duplicate values; and selectively adding certain elements of the second vector register based on the element addresses in the first vector register having the duplicated values.

3. The method of claim 2, wherein loading a first vector register with addressing values and a second vector register operand values, identifying element addresses of the first vector register, and selectively adding certain elements of the second vector register are performed in parallel in the plurality of processors.

4. A system comprising:

a first vector register having addressing values;

a second vector register having operand values;

circuitry programmed to determine which, if any, element addresses of the first vector register have a value that duplicates a value in another element address, the circuitry is configured to:

generate each respective address value for a sequence of addressed locations within a constrained memory area, wherein the constrained memory area includes $2^N$ consecutive addresses, wherein the addressed locations within the constrained memory area are addressed using an N-bit value derived from each respective addressing value of the first vector register, and wherein the constrained memory area is separate from and does not overlap the first memory area;

load, into a third vector register, identifying data values that can be used to identify elements in the third vector register;

store the identifying data values in the third vector register to the constrained memory area using the generated sequence of respective address values;

read data values from the constrained memory area using the generated sequence of respective address values; and compare the identifying data values in the third vector register to the data values read from the constrained memory area to identify duplicate values; and circuitry programmed to selectively add certain elements of the second vector register based on the element addresses in the first vector register having the duplicated values.

5. The system of claim 4, further comprising:

a plurality of processors, each processor including an instance of each of:

the first, second and third vector registers;

the circuitry programmed to determine which, if any, element addresses of the first vector register have a value that duplicates a value in another element address;

the circuitry programmed to selectively add certain elements of the second vector register based on the element addresses in the first vector register having the duplicated values.

6. A system comprising:

a plurality of processors, one or more of which includes:

means for loading addressing values into elements of a first vector register, wherein each of the addressing values is added to a first base address of a first memory area to calculate a corresponding location within the first memory area; and means for determining which, if any, element addresses of the first vector register have a value that duplicates a value in another element address of the first vector register, wherein the means for determining is configured to:

generate each respective address value for a sequence of addressed locations within a constrained memory area, wherein the constrained memory area includes $2^N$ consecutive addresses, wherein the addressed locations within the constrained memory area are addressed using an N-bit value derived from each respective addressing value of the first vector register, and wherein the constrained memory area is separate from and does not overlap the first memory area;

load, into a second vector register, identifying data values that can be used to identify elements in the second vector register;

store the identifying data values in the second vector register to the constrained memory area using the generated sequence of respective address values;

read data values from the constrained memory area using the generated sequence of respective address values; and compare the identifying data values in the second vector register to the data values read from the constrained memory area to identify duplicate values.

7. A non-transitory computer-readable medium having instructions stored thereon for causing a suitably programmed information-processing system to execute a method comprising:

determining which, if any, element addresses of a first vector register have a value that duplicates a value in another element address;

selectively adding certain elements of a second vector of operand values based on the element addresses of the duplicated values in the first vector register;

loading, using addressing values from the first vector register, elements from memory into a third vector register;

adding values from the third vector register and the second vector register to generate a result vector; and storing the result vector to memory using the addressing values from the first vector register;

wherein the determining of duplicates includes:

loading addressing values into elements of the first vector register, wherein each of the addressing values is added to a first base address of a first memory area to calculate a corresponding location within the first memory area;

generating each respective address value for a sequence of addressed locations within a constrained memory area, wherein the constrained memory area includes $2^N$ consecutive addresses, wherein the addressed locations within the constrained memory area are addressed using an N-bit value derived from each respective addressing value of the first vector register, and wherein the constrained memory area is separate from and does not overlap the first memory area;

loading, into a fourth vector register, identifying data values that can be used to identify elements in the fourth vector register;

storing the identifying data values in the fourth vector register to the constrained memory area using the generated sequence of respective address values;

reading data values from the constrained memory area using the generated sequence of respective address values; and comparing the identifying data values in the fourth vector register to the data values read from the constrained memory area to identify duplicate values.

8. A method of performing mathematical operations on a vector register, comprising:

loading a first vector register with addressing values;

loading a second vector register with operand values;

determining which, if any, element addresses of the first vector register have a value that duplicates a value in another element address, wherein determining includes:

loading addressing values into elements of the first vector register, wherein each of the addressing values is added to a first base address of a first memory area to calculate a corresponding location within the first memory area;

generating each respective address value for a sequence of addressed locations within a constrained memory area, wherein the constrained memory area includes $2^N$ consecutive addresses, wherein the addressed locations within the constrained memory area are addressed using an N-bit value derived from each respective addressing value of the first vector register, wherein the constrained memory area is separate from and does not overlap the first memory area;

loading, into a third vector register, identifying data values that can be used to identify elements in the third vector register;

storing the identifying data values in the third vector register to the constrained memory area using the generated sequence of respective address values;

reading data values from the constrained memory area using the generated sequence of respective address values; and comparing the identifying data values in the third vector register to the data values read from the constrained memory area to identify duplicate values;

selectively performing a mathematical operation on certain elements of the second vector of operand values based on the element addresses of the duplicated values in the first vector register;

loading, using addressing values from the first vector register, elements from memory into a fourth vector register;

performing mathematical operations on elements from the fourth vector register and elements from the second vector register to generate a result vector; and storing the result vector to memory using the addressing values from the first vector register.

* * * * *

UNITED STATES PATENT AND TRADEMARK OFFICE

CERTIFICATE OF CORRECTION

PATENT NO. : 7,793,073 B2
APPLICATION NO. : 11/771931
DATED : September 7, 2010
INVENTOR(S) : James R. Kohn It is certified that error appears in the above-identified patent and that said Letters Patent is hereby corrected as shown below:

In The Specifications:
In column 6, line 12, delete “8.5” and insert -- 8...5 --, therefor.

Signed and Sealed this

Fourteenth Day of December, 2010

David J. Kappos
*Director of the United States Patent and Trademark Office*